US012689254B2

(12) United States Patent
Faust et al.

(10) Patent No.: US 12,689,254 B2
(45) Date of Patent: Jul. 21, 2026

(54) STATOR WIRE INSULATION RING WITH TERMINAL CONNECTIVITY

(71) Applicant: Nidec Motor Corporation, St. Louis, MO (US)

(72) Inventors: Steven Faust, St. Louis, MO (US); Paul G. Michaels, St. Louis, MO (US)

(73) Assignee: Nidec Motor Corporation, Creve Coeur, MO (US)

( * ) Notice: Subject to any disclaimer, the term of this patent is extended or adjusted under 35 U.S.C. 154(b) by 504 days.

(21) Appl. No.: 18/326,998

(22) Filed: May 31, 2023

(65) Prior Publication Data

US 2024/0405625 A1 Dec. 5, 2024

(51) Int. Cl.
| | |
|---|---|
| *H02K 3/28* | (2006.01) |
| *H02K 1/16* | (2006.01) |
| *H02K 3/34* | (2006.01) |
| *H02K 3/50* | (2006.01) |
| *H02K 5/22* | (2006.01) |

(52) U.S. Cl.
CPC ................. *H02K 3/28* (2013.01); *H02K 1/16* (2013.01); *H02K 3/345* (2013.01); *H02K 3/50* (2013.01); *H02K 5/225* (2013.01)

(58) Field of Classification Search
CPC ................................... H02K 3/28; H02K 3/50
USPC .......................................................... 310/71
See application file for complete search history.

(56) References Cited

U.S. PATENT DOCUMENTS

| | | | | |
|---|---|---|---|---|
| 1,471,834 | A | * 10/1923 | Defibaugh | H02K 5/225 |
| | | | | 310/71 |
| 2,583,804 | A | * 1/1952 | Andrus | H02K 3/44 |
| | | | | 174/74 A |
| 2,668,925 | A | * 2/1954 | Bloser | H02K 3/50 |
| | | | | 310/43 |
| 3,482,128 | A | * 12/1969 | Tomkinson | H02K 5/225 |
| | | | | 310/85 |
| 3,638,055 | A | * 1/1972 | Zimmermann | H02K 44/085 |
| | | | | 310/43 |
| 3,984,712 | A | * 10/1976 | Hill | H02K 3/50 |
| | | | | 310/71 |
| 4,322,647 | A | 3/1982 | Neroda | |
| 5,006,744 | A | * 4/1991 | Archer | H02K 11/33 |
| | | | | 310/58 |
| 5,543,671 | A | * 8/1996 | Williams | H01H 9/02 |
| | | | | 200/80 R |

(Continued)

FOREIGN PATENT DOCUMENTS

CN         212114951         12/2020

*Primary Examiner* — Alexander Talpalatski
(74) *Attorney, Agent, or Firm* — Hovey Williams LLP

(57) ABSTRACT
An electric motor includes a stator assembly. The stator assembly includes a stator body and a generally toroidal stator ring. The stator body includes a core and a plurality of electrically conductive wires wound about the core. Each of the electrically conductive wires includes a first wire end projecting from the stator body at a predetermined first wire end location. The stator ring defines a plurality of arcuately spaced apart first terminal pockets, each configured to receive a wire-connecting terminal. The stator ring is oriented relative to the stator body such that the first terminal pockets are disposed in predetermined first terminal pocket positions correlating to the predetermined first wire end locations. Each of the first wire ends extends into a respective one of the first terminal pockets.

18 Claims, 15 Drawing Sheets

(56)　　　　　　References Cited

U.S. PATENT DOCUMENTS

| | | | | |
|---|---|---|---|---|
| 6,081,056 | A * | 6/2000 | Takagi | H02K 5/08 |
| | | | | 310/43 |
| 6,380,648 | B1 * | 4/2002 | Hsu | H02K 11/33 |
| | | | | 310/67 A |
| 6,674,195 | B2 * | 1/2004 | Yagyu | H02K 3/50 |
| | | | | 310/71 |
| 6,856,055 | B2 | 2/2005 | Michaels et al. | |
| 6,949,848 | B2 * | 9/2005 | Yamada | H02K 3/522 |
| | | | | 310/260 |
| 7,202,581 | B2 * | 4/2007 | Sasaki | H02K 3/522 |
| | | | | 310/71 |
| 8,896,169 | B2 * | 11/2014 | Song | H02K 5/207 |
| | | | | 310/71 |
| 9,071,183 | B2 * | 6/2015 | Becerra | H02P 5/74 |
| 9,479,025 | B2 * | 10/2016 | Kawata | B62D 5/0412 |
| 10,218,239 | B2 | 2/2019 | Li et al. | |
| 10,396,616 | B2 | 8/2019 | Beetz et al. | |
| 10,742,003 | B2 * | 8/2020 | Takahashi | H02K 21/14 |
| 11,735,972 | B2 * | 8/2023 | Bailey | H02K 3/345 |
| | | | | 310/216.115 |
| 2016/0126802 | A1 * | 5/2016 | Nagao | H02K 5/22 |
| | | | | 310/71 |
| 2018/0093698 | A1 * | 4/2018 | Urimoto | B62D 5/0406 |
| 2020/0259389 | A1 | 8/2020 | Hotta | |
| 2021/0111603 | A1 | 4/2021 | Chia-Chi et al. | |

* cited by examiner

STATOR WIRE INSULATION RING WITH TERMINAL CONNECTIVITY

BACKGROUND OF THE INVENTION

1. Field of the Invention

The present invention relates generally to a stator assembly for use in an electric motor. More particularly, the present invention concerns an insulative ring for routing and connection of wires associated with the stator assembly of the electric motor.

2. Discussion of the Prior Art

Electric motors often include a stator core and wiring wound about the core to form a plurality of coils. In a conventional three (3) phase electric motor, the stator wiring comprises three (3) electrically conductive wires, sometimes referred to as magnet wires, each associated with one of the electrical phases. Each magnet wire presents start and finish ends. Half of the magnet wire ends are joined to form a three-way or WYE connection via use of an AMPLIVAR connector or other conventional connection means, and the remaining magnet wire ends are individually connected to first ends of respective lead wires via a manual crimping process. The other ends of the lead wires are thereafter typically routed through a grommet in a motor endshield to ensure correct orientation and sufficient securement. These lead wire ends are then connected to a motor controller or other element, in keeping with the design of the particular motor.

Proper insulation of the magnet wires, lead wires, and connections is necessary, with particular attention to high electric potentials and clearance relative to conductive material. For instance, each of the magnet wire ends and lead ends is conventionally provided with insulative tubing to protect against high electric potentials.

Appropriate routing and control of the magnet wires and lead wires is necessary to avoid contact with the rotor, with routing and implementation of connections being a time-consuming process that is also susceptible to errors due to the complexity of the required routes, the precise natures of the connections, and so on. More particularly, the various magnet wires and lead wires are typically routed manually around the stator and secured in place via cable ties. The WYE connection and wire-to-lead connections are also typically manually implemented at non-fixed locations. That is, although a general area for the location of each connection may be understood by design, no structural elements, guides, or indicators are provided to standardize or fix the locations.

As will be readily apparent to those of ordinary skill in the art, the conventional assembly process described above is time- and labor-intensive. The process is also prone to variability and error due to its complex nature and lack of positionally defined structural connection aids or elements.

SUMMARY

According to one aspect of the present invention, an electric motor comprises a stator assembly. The stator assembly includes a stator body and a generally toroidal stator ring. The stator body includes a core and a plurality of electrically conductive wires wound about the core. Each of the electrically conductive wires includes a first wire end projecting from the stator body at a predetermined first wire end location. The stator ring defines a plurality of arcuately spaced apart first terminal pockets, each configured to receive a wire-connecting terminal. The stator ring is oriented relative to the stator body such that the first terminal pockets are disposed in predetermined first terminal pocket positions correlating to the predetermined first wire end locations. Each of the first wire ends extends into a respective one of the first terminal pockets.

This summary is provided to introduce a selection of concepts in a simplified form. These concepts are further described below in the detailed description of the preferred embodiments. This summary is not intended to identify key features or essential features of the claimed subject matter, nor is it intended to be used to limit the scope of the claimed subject matter.

Various other aspects and advantages of the present invention will be apparent from the following detailed description of the preferred embodiments and the accompanying drawing figures.

BRIEF DESCRIPTION OF THE DRAWING FIGURES

Preferred embodiments of the present invention are described in detail below with reference to the attached drawing figures, wherein.

Figure 1:
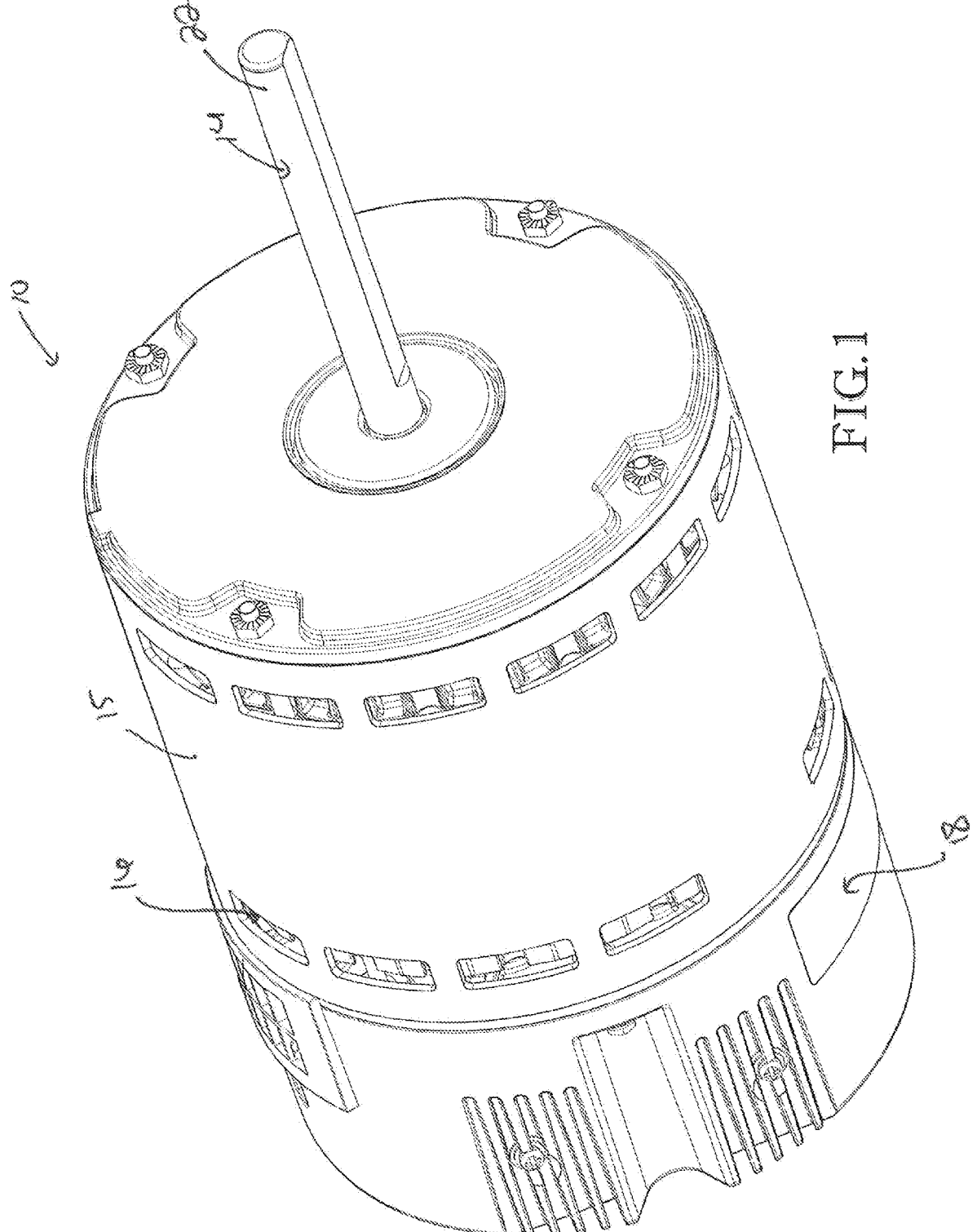
FIG. 1 is a bottom perspective view of a motor in accordance with a first preferred embodiment of the present invention.
Figure 2:
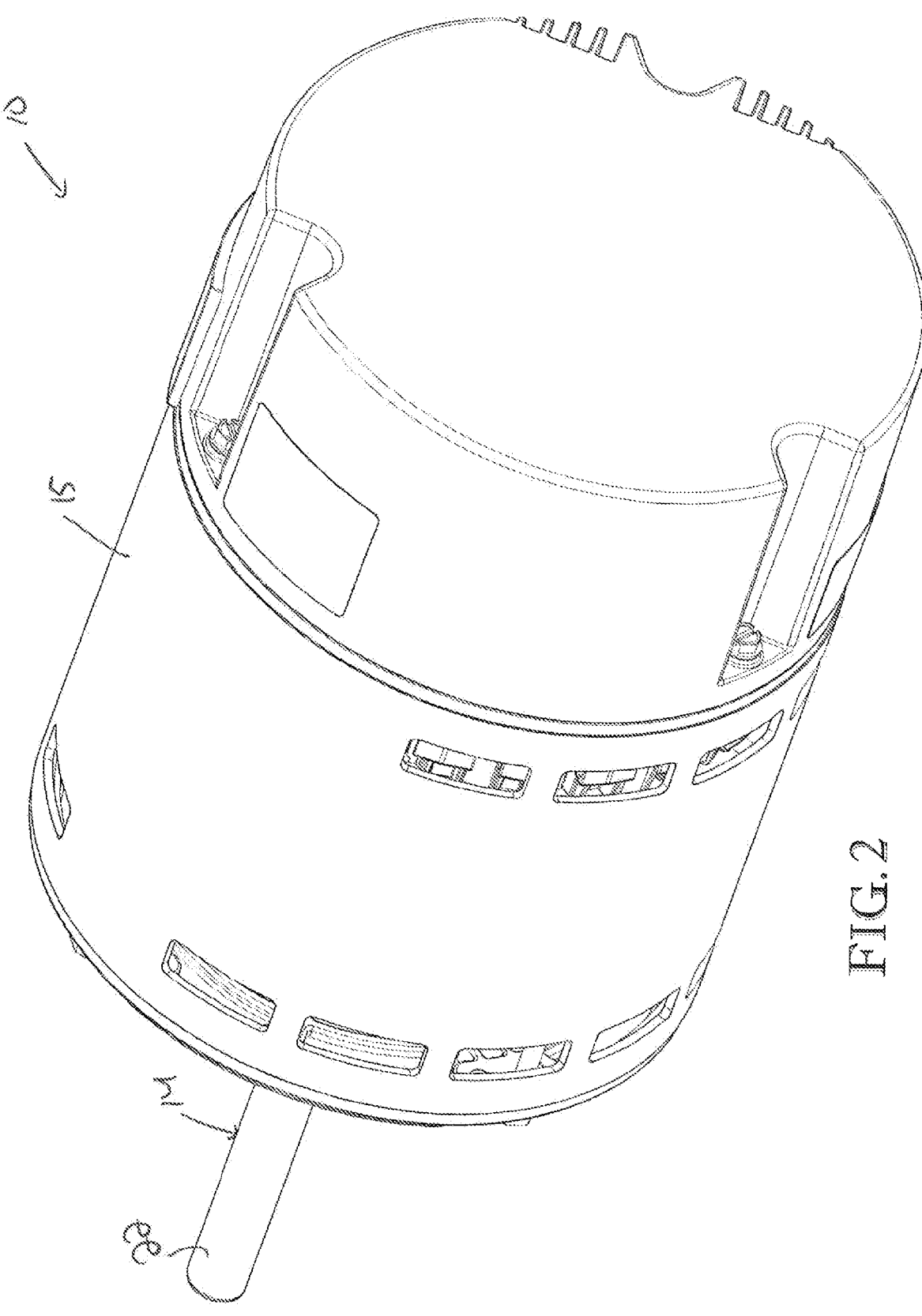
FIG. 2 is a top perspective view of the motor of FIG. 1.
Figure 3:
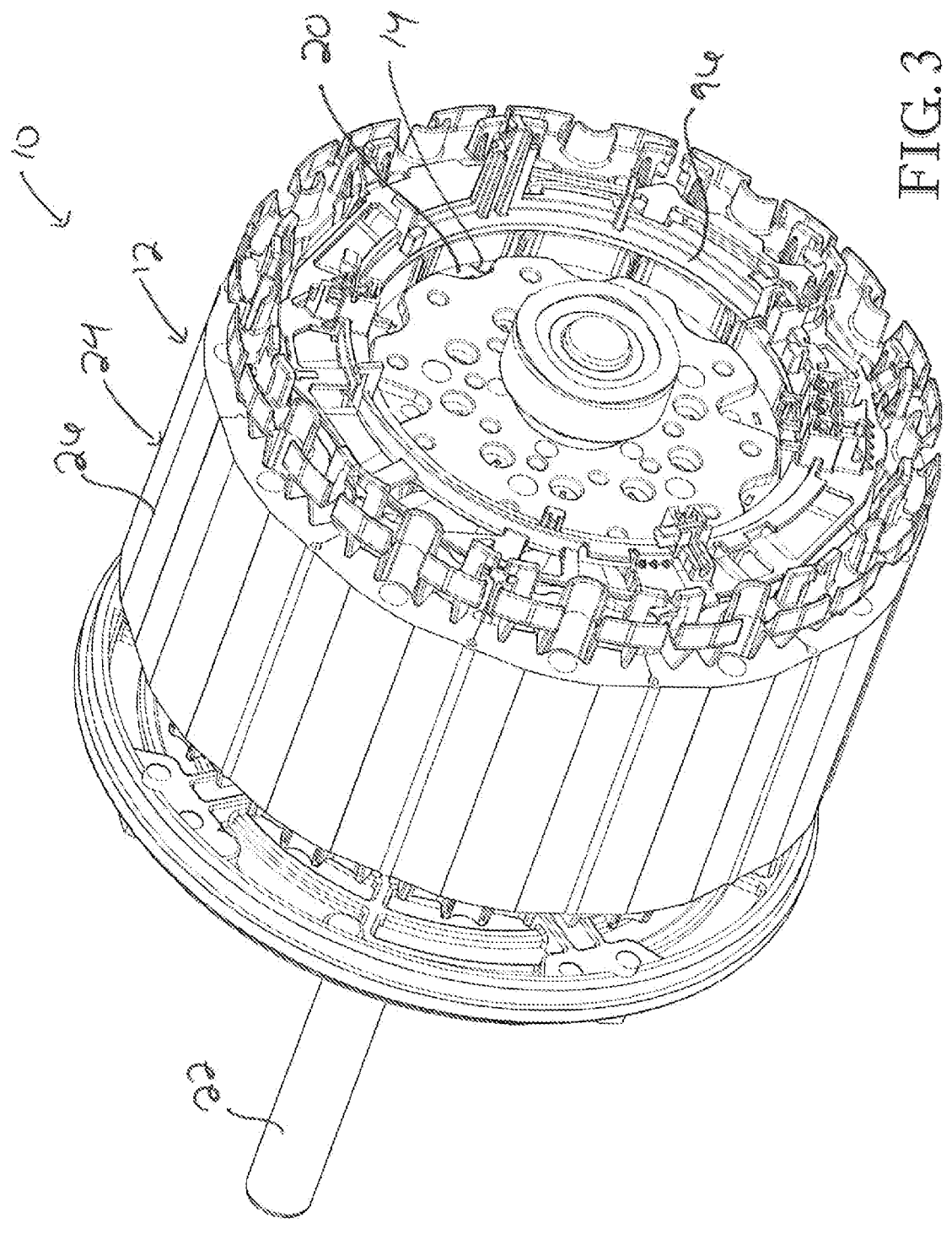
FIG. 3 is a top perspective view of the motor of FIGS. 1 and 2, with the motor housing largely removed.
Figure 4:
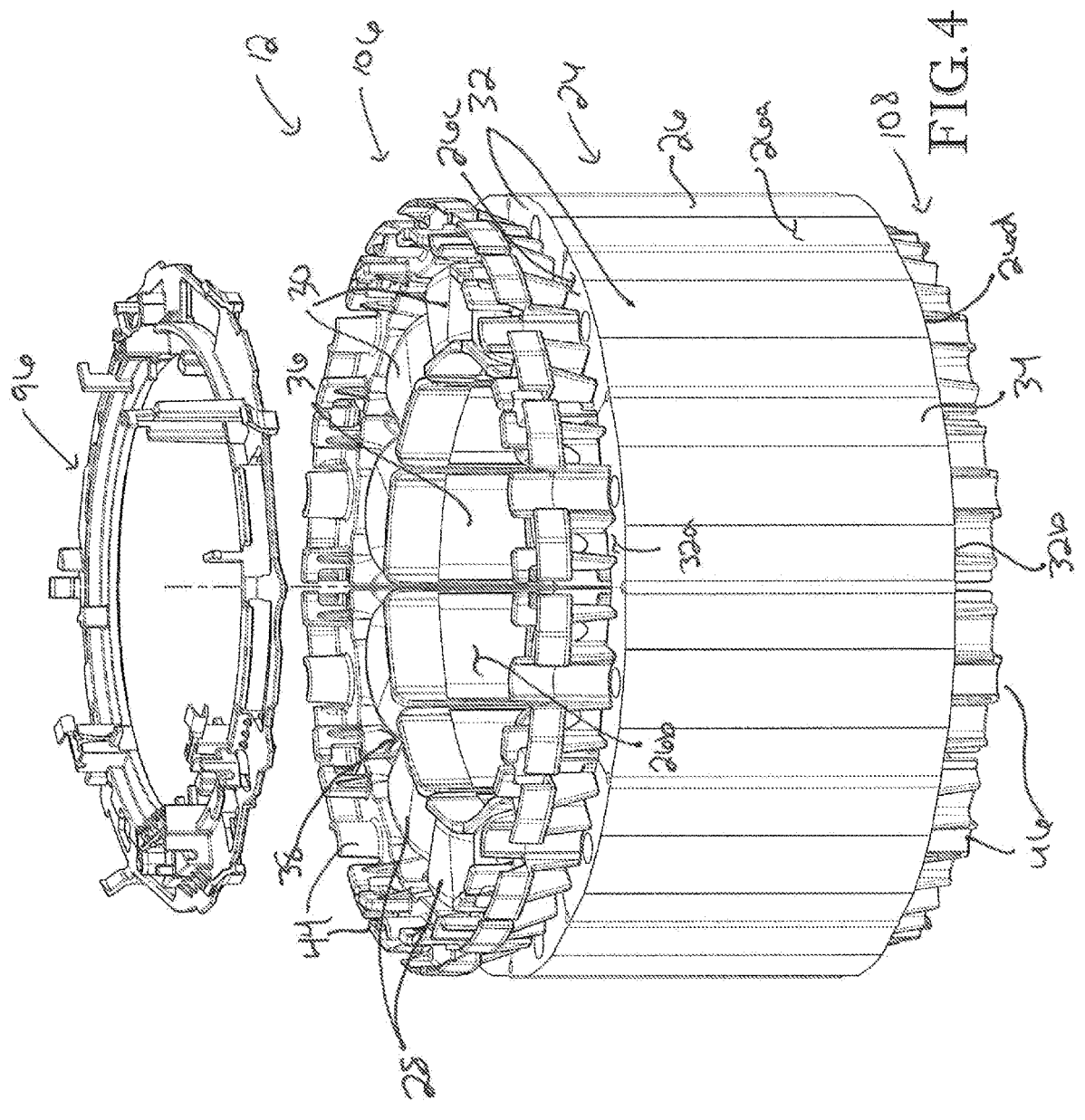
FIG. 4 is a partially exploded side perspective view of the stator assembly of the motor of FIGS. 1-3, without wiring about the stator ring.

The drawing figures do not limit the present invention to the specific embodiments disclosed and described herein. While the drawings do not necessarily provide exact dimensions or tolerances for the illustrated structures or components, the drawings are to scale with respect to the relationships between the components of the structures illustrated in the drawings.

DETAILED DESCRIPTION

The present invention is susceptible of embodiment in many different forms. While the drawings illustrate, and the specification describes, certain preferred embodiments of the invention, it is to be understood that such disclosure is by way of example only. There is no intent to limit the principles of the present invention to the particular disclosed embodiments.

Furthermore, unless specified or made clear, the directional references made herein with regard to the present invention and/or associated components (such as top, bottom, upper, lower, inner, outer, and so on) are used solely for the sake of convenience and should be understood only in relation to each other. For instance, a component might in practice be oriented such that faces referred to as "top" and "bottom" are sideways, angled, inverted, and so on relative to the chosen frame of reference.

Motor Overview

In a preferred embodiment of the present invention, a motor 10 is provided. The motor 10 preferably includes a stator assembly 12 and a rotor 14 rotatable about an axis. The motor 10 further preferably includes a housing 15 defining a motor chamber 16. The stator assembly 12 and the rotor 14 are at least substantially received in the motor chamber 16.

The housing 15 further preferably defines a controller chamber 18. The motor 10 further includes a controller (not shown). The controller is preferably at least substantially received in the controller chamber 18.

The housing 15 also preferably includes an endshield 19 (see FIG. 16) disposed between and in part defining each of the motor chamber 16 and the controller chamber 18.

Most preferably, the motor chamber 16 and the controller chamber 18 are axially aligned, with the endshield 19 disposed axially therebetween. Non-axial configurations fall within the scope of some aspects of the present invention, however.

The rotor 14 preferably includes a rotor core 20 and a plurality of magnets (not shown) embedded in the core 20. The rotor 14 also preferably includes a shaft 22 extending along an axis. As noted previously, the rotor 14 is rotatable about the axis.

The stator assembly 12 preferably includes a stator body 24. The stator body 24 comprises a generally toroidal stator core 26 and a plurality of coils 28 wound about the stator core 26. The coils 28 comprise electrically conductive wiring 30 and, more particularly, a plurality of electrically conductive magnet wires 30. The magnet wires 30 are preferably formed of copper or aluminum, although any one or more of a variety of electrically conductive materials or a combination thereof may be used within the ambit of the present invention. Furthermore, the magnet wires 30 may be coated or uncoated.

The stator core 26 may be a laminated or non-laminated (solid) stator core. The stator core 26 preferably comprises a ferromagnetic material such as steel, although use of any one or more electrically conductive materials is permissible without departing from the scope of the present invention.

In the assembled form, the stator core 26 preferably includes a plurality of arcuately spaced apart teeth 32. In a preferred embodiment, each of the teeth 32 includes a generally circumferentially extending yoke 34, a generally radial arm (not shown) extending from the yoke 34 and having an outer end adjacent the yoke 34, and a crown 36 extending generally circumferentially from an inner end of the arm.

The stator body 24 preferably at least substantially circumscribes the rotor, such that the motor is an inner rotor motor. Certain aspects of the present invention are applicable to dual rotor or outer rotor motors, however.

Each yoke 34 preferably engages a pair of adjacent yokes 34, such that the yokes 34 cooperatively present an outer circumferential stator core face 26a. The crowns 36 cooperatively present a discontinuous inner circumferential stator core face 26b configured to face the rotor 14.

Each tooth 32 preferably presents an upper tooth face 32a, a lower tooth face 32b, and two side tooth faces (not shown). The teeth 32 (or, more particularly, the upper tooth faces 32a) preferably cooperatively present an upper stator core face 26c. Similarly, the teeth 32 (or, more particularly, the lower tooth faces 32b) preferably cooperatively present a lower stator core face 26d.

It is permissible according to some aspects of the present invention for the stator core to be alternatively configured, however. Among other things, for instance, the stator core could comprise a plurality of interconnected multi-tooth segments, comprise one or more helically wound laminations, or comprise stacked annular laminations each formed from a single punched strip.

The wiring 30 (alternatively, the magnet wires 30) is preferably wound about the arms of the teeth 32 to form the coils 28 around the teeth 32. More particularly, a slot 38 is defined between each adjacent pair of teeth 32. The wiring 30 is preferably wound about the teeth 32 and through the slots 38 so as to circumscribe or loop about respective ones of the arms, thus forming the coils 28 about the teeth 32.

As is customary and as will be discussed in greater detail below, the wiring 30 is wound around the teeth 32 in a particular manner according to the configuration and desired performance characteristics of the motor. In the illustrated embodiment, for instance, the motor 10 is a three (3) phase motor 10, with the wiring 30 thus comprising three (3) magnet wires 30a, 30b, and 30c, each of which is associated with a respective phase and each of which forms four (4) coils 28, for a total of twelve (12) coils 28 encircling twelve (12) teeth 32.

As will also be discussed in greater detail below, each magnet wire 30a, 30b, and 30c includes respective magnet wire start ends 40a, 40b, and 40c. Similarly, each magnet wire 30a, 30b, and 30c includes respective magnet wire finish ends 42a, 42b, and 42c.

The stator core 26 is preferably electrically insulated by means of upper and lower (or, alternatively described, lead end and opposite lead end) electrically insulative end caps 44 and 46, respectively, fitted over portions of the teeth 32 so as to be disposed between the teeth 32 and the coils 28. Each end cap 44 or 46 preferably comprises an at least substantially electrically insulative material and thus provides both a physical and electrical barrier between the coils 28 and the stator core 26. For instance, a plastic or synthetic resin material may be used. Other materials having suitable electrically insulative properties are permissible, however.

The end caps 44 and 46 preferably provide all necessary insulation for the stator core 26 relative to the coils 28. That is, it is preferable that no other insulation is provided to the stator core 26 beyond the end caps 44 and 46. For instance, the stator core 26 is preferably devoid of (or not associated with) insulative inserts or liners such as those comprising Mylar or paper; powder coating; and/or additional insulative overlayments including but not limited to overmolding. Alternative or additional insulation means are permissible, however, without departing from the scope of the present invention.

Lead End End Caps

In a preferred embodiment, the upper (alternatively, lead end or first-type) end caps 44 are each preferably provided with wire routing and management structure.

Figures 5, 6:
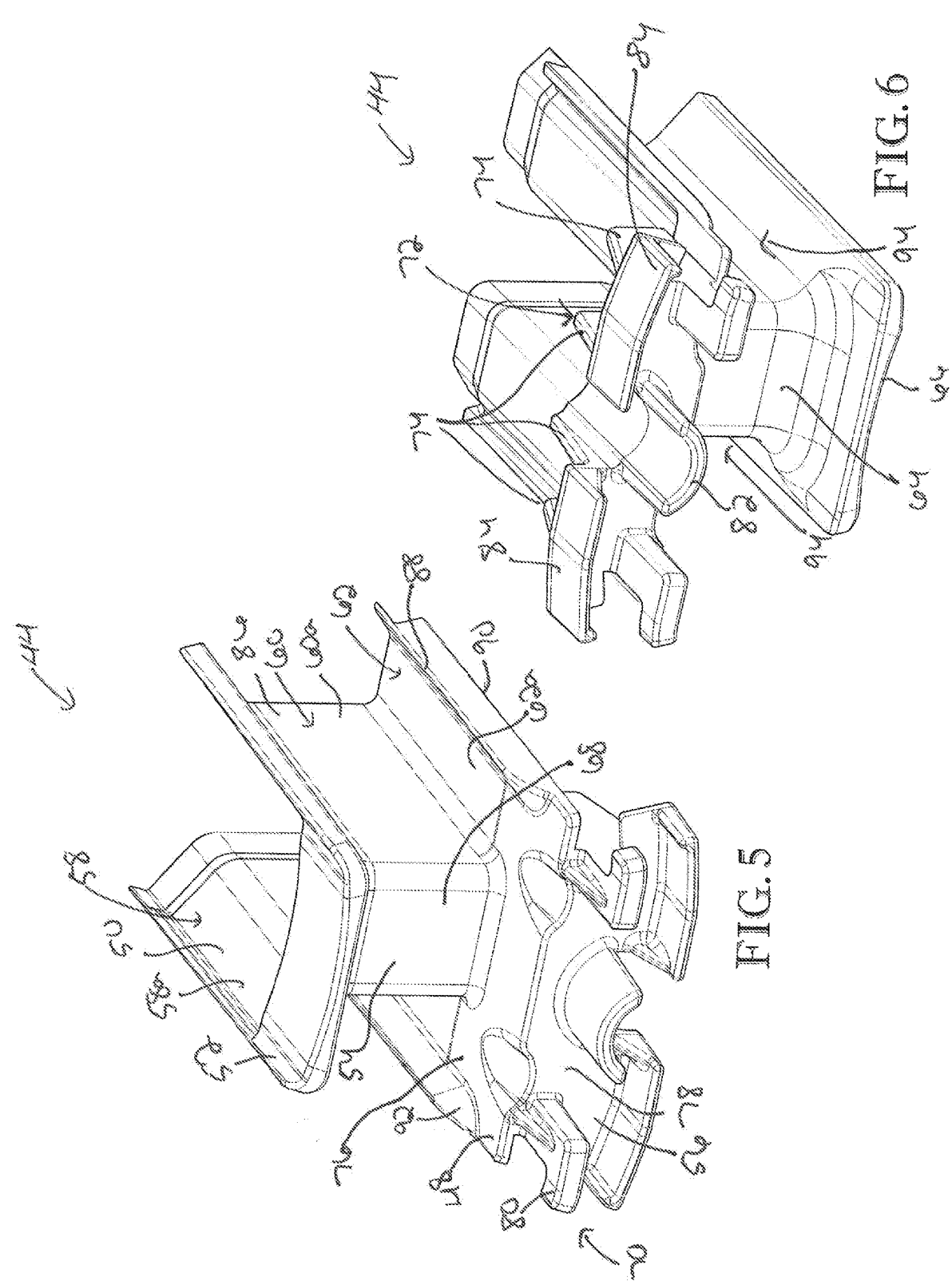
FIG. 5 is a perspective view of a lead-end end cap of the stator assembly of FIG. 4.
FIG. 6 is an alternate perspective view of the lead-end end cap of FIG. 5.

More particularly, as best shown in FIGS. 5 and 6, each upper end cap 44 includes a top 48 and an axially downwardly extending skirt 50. Each top 48 includes a top crown portion 52, a top arm portion 54, and a top yoke portion 50. Each skirt 50 includes a skirt crown portion 58, a skirt arm portion 60, and a skirt yoke portion 62.

The top 48 corresponds to and is most preferably configured to fully overlie the crown and arm portions of the upper face 32a of the corresponding tooth 32 and to overlie or shield at least part of the yoke portion of the upper face 32a of the corresponding tooth 32.

Each skirt 50 preferably extends along both of the tangentially or circumferentially spaced apart side faces (not shown) of the corresponding tooth 32 so as to fully overlie the upper portions of the crown, arm, and yoke portions of the side faces.

Each top crown portion 52 preferably includes a generally radially and circumferentially extending crown overlayment 64 and an axially upwardly extending crown retaining wall 66 projecting from the crown overlayment 64 for restricting radially inward movement of the coils 28.

Each top arm portion 54 preferably includes a generally radially and circumferentially extending arm overlayment 68.

Each top yoke portion 50 preferably includes a wire management structure 70 and a support structure 72. The support structure 72 preferably includes a plurality of brackets 74 that engage the yoke portion of the upper face 32a and extend axially upwardly to a portion of the wire management structure 70.

The wire management structure 70 of each lead end or upper end cap 44 facilitates routing of the wiring 30. More particularly, the wire management structure 70 preferably includes a retaining wall 76, a floor 78, a pair of hooks 80, a fastener shield 82, and a two-part outer barrier 84.

In greater detail, the retaining wall 76 preferably projects axially upwardly and tangentially from an outer end of the corresponding arm overlayment 68, near the outer end of the corresponding arm (not shown). The retaining wall 76 is most preferably disposed radially inwardly of the brackets 74. The floor 78 preferably extends generally orthogonally from the retaining wall 76 and is supported by the brackets 74. The hooks 80 extend axially upwardly from tangentially (or circumferentially) opposed ends of the floor 78, and the fastener shield 82 projects axially upwardly and downwardly from the arcuate center of the floor 78. The downwardly projecting portion of the fastener shield 82 is preferably disposed between a pair of the brackets 74. The outer barrier 84 preferably extends generally orthogonally from a radially outer edge of the floor 78.

Each skirt 50 preferably includes a pair of tangentially or circumferentially spaced apart skirt sides 86, each of which extends along a respective one of the side faces of the corresponding tooth 32. More particularly, each skirt side 86 includes a skirt crown portion side 58a, a skirt arm portion side 60a, and a skirt yoke portion side 62a, each of which extends along and overlies the corresponding crown, arm, and yoke portions of the corresponding side face.

Each skirt 50 also preferably cooperates with the wire management structure 70 of the top yoke portion 50 to define a pair of wire barrier portions 88. More particularly, the retaining wall 76 and the skirt yoke portions 62a of each side 86 cooperatively present a pair of tangentially or circumferentially outermost edges 90. Each wire barrier portion 88 preferably extends axially along the skirt 50 and a portion of the retaining wall 76, adjacent the corresponding edge 90, and projects radially inwardly.

The wire barrier portions 88 each include an end 92. The end 92 is preferably rounded or smoothed in some manner, as opposed to presenting a squared, jagged, or otherwise rough or abruptly edged form.

Preferably, each set of corresponding skirt crown portion sides 58a, skirt arm portions sides 60a, skirt yoke portion sides 62a, retaining walls 76, and wire barrier portions 88 cooperatively defines a wire trough 94 through which wiring 30 is wound and in which a part of the corresponding coil 28 is disposed. Furthermore, each wire barrier portion 88 preferably at least in part defines a tangential or circumferential margin of the aforementioned trough portion 94.

The lower end caps 46 are not discussed in detail herein. However, it is noted that certain features of the lower end caps 46 are similar or identical to those described above with regard to the upper end caps 44. Furthermore, the upper and lower end caps 44 and 46 are configured to engage one another in such a manner as to cooperatively fully circumscribe each tooth 32.

Additional structural and functional details of the preferred upper and lower end caps 44 and 46 may be found in U.S. patent application Ser. No. 16/862,641, filed Apr. 30, 2020, and entitled OVERLAPPED END CAPS FOR STATOR CORE, the entirety of which is incorporated by reference herein in its entirety. Alternative types and configurations of end caps or insulative structures may also be used without departing from the scope of some aspects of the present invention, however.

Stator Wire Insulation Ring Overview

In a preferred embodiment, the stator assembly 12 is additionally provided with a stator wire insulation ring 96. As will be discussed in greater detail below, the ring 96 is secured to the stator body 24 and facilitates additional routing of the aforementioned stator wiring 30. The ring 96 also facilitates interconnection of the stator wiring 30 to lead wires 98, as well as routing of such lead wires 98.

In a broad sense, the stator wire insulation ring 96 preferably includes an arcuately extending, generally toroidal main body 100. The ring body 100 is preferably sized and shaped in a complementary manner to the stator core 26 (or, more broadly, the stator body 24), so as to present a similar inner diameter and a smaller outer diameter. In this manner, interference with the rotor 14 and the housing 15 are avoided. Certain variations in sizing and shaping of the ring are permissible without departing from the scope of some aspects of the present invention, however. For instance, radially inward extension well beyond that of the stator core but not interfering with the rotor shaft would be permissible in some instances, as would outward extension still accommodated within the motor chamber. Again, however, sizing and shaping of the ring 96 in general congruency with the sizing and shaping of the stator core 26 is most preferred.

The ring body 100 preferably defines a plurality of ventilation openings 102 therethrough so as to be generally scaffold-like or strut-like in design. More particularly, the openings 102 are such that the ring body 100 includes a plurality of struts 104.

The openings 102 facilitate airflow to the coils 28 after installation of the ring 96 as discussed below. The openings 102 in turn facilitate dispersion of heat from the stator assembly 12 (and, in particular, from the coils 28 of the stator body 24). Still further, the openings 102 reduce the amount of material needed for production of the ring 96, thereby both reducing material cost and reducing weight. It is particularly noted, however, that sufficient rigidity and structural integrity of the ring 96 must be maintained. Appropriate insulative capabilities, as discussed below, should also not be hindered.

With regard to insulative properties from a material perspective, the ring 96 preferably comprises an at least substantially electrically insulative material. For instance, a plastic or synthetic resin material may be used. Other materials having suitable electrically insulative properties are permissible, however.

The stator body 24 preferably presents a lead end 106 and an axially opposed opposite lead end 108 corresponding positionally to the lead end and opposite lead end end caps 44 and 46. As illustrated, the ring 96 is preferably disposed at the lead end 106 of the stator body 24 so as to at least in part overlie the coils 28 and the lead end end caps 44. Most preferably, the ring 96 is removably secured to the stator body 24 at the lead end 106. In the illustrated embodiment, for instance, the ring 96 is secured to the lead end end caps 44 via a snap fit.

Figure 7:
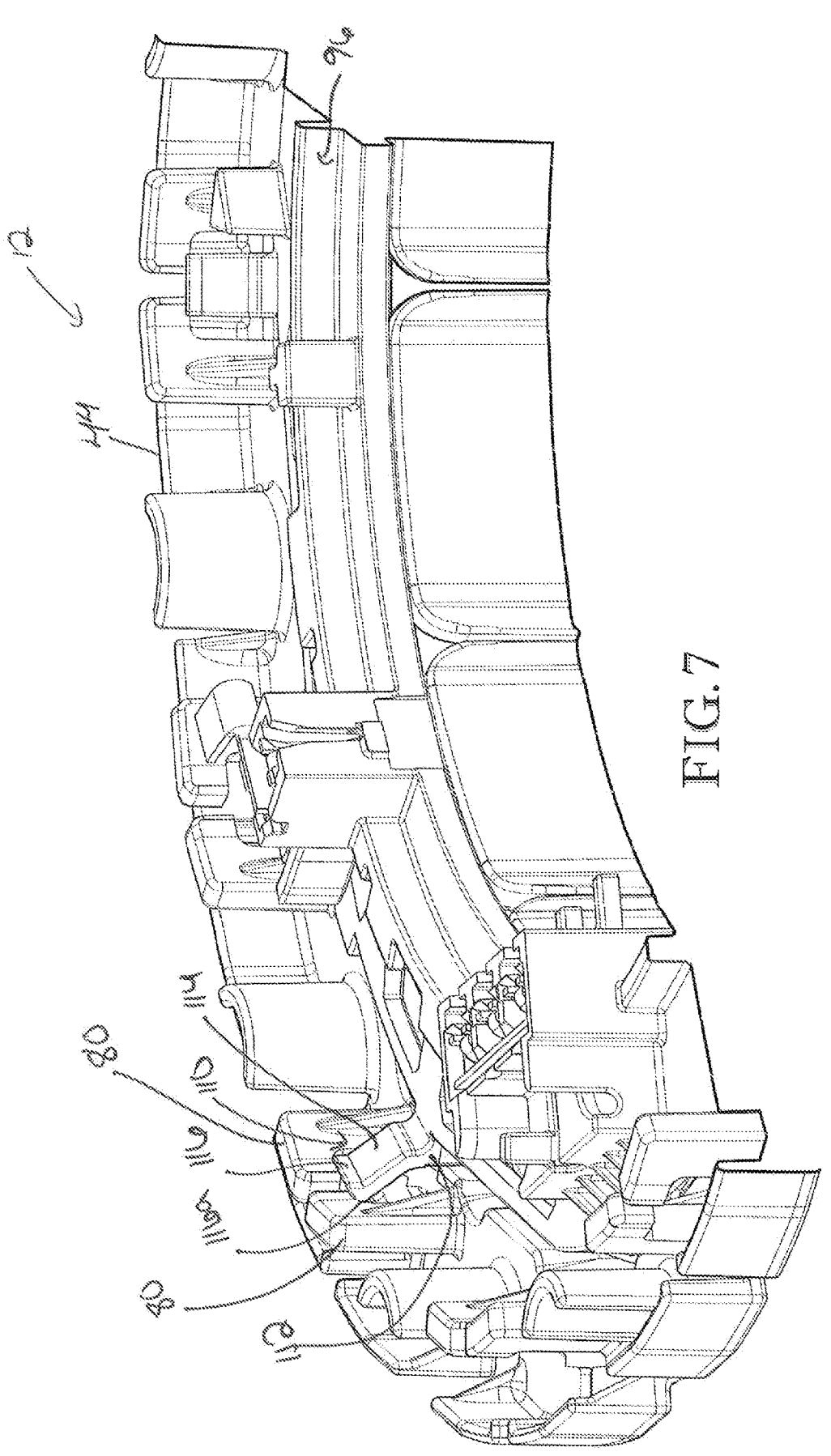
FIG. 7 is a partially sectioned inner side perspective view of a portion of the stator assembly of FIG. 4, without wiring shown but with terminals illustrated and with one magnet wire tie-off shown in a final cut state.
Figure 8:
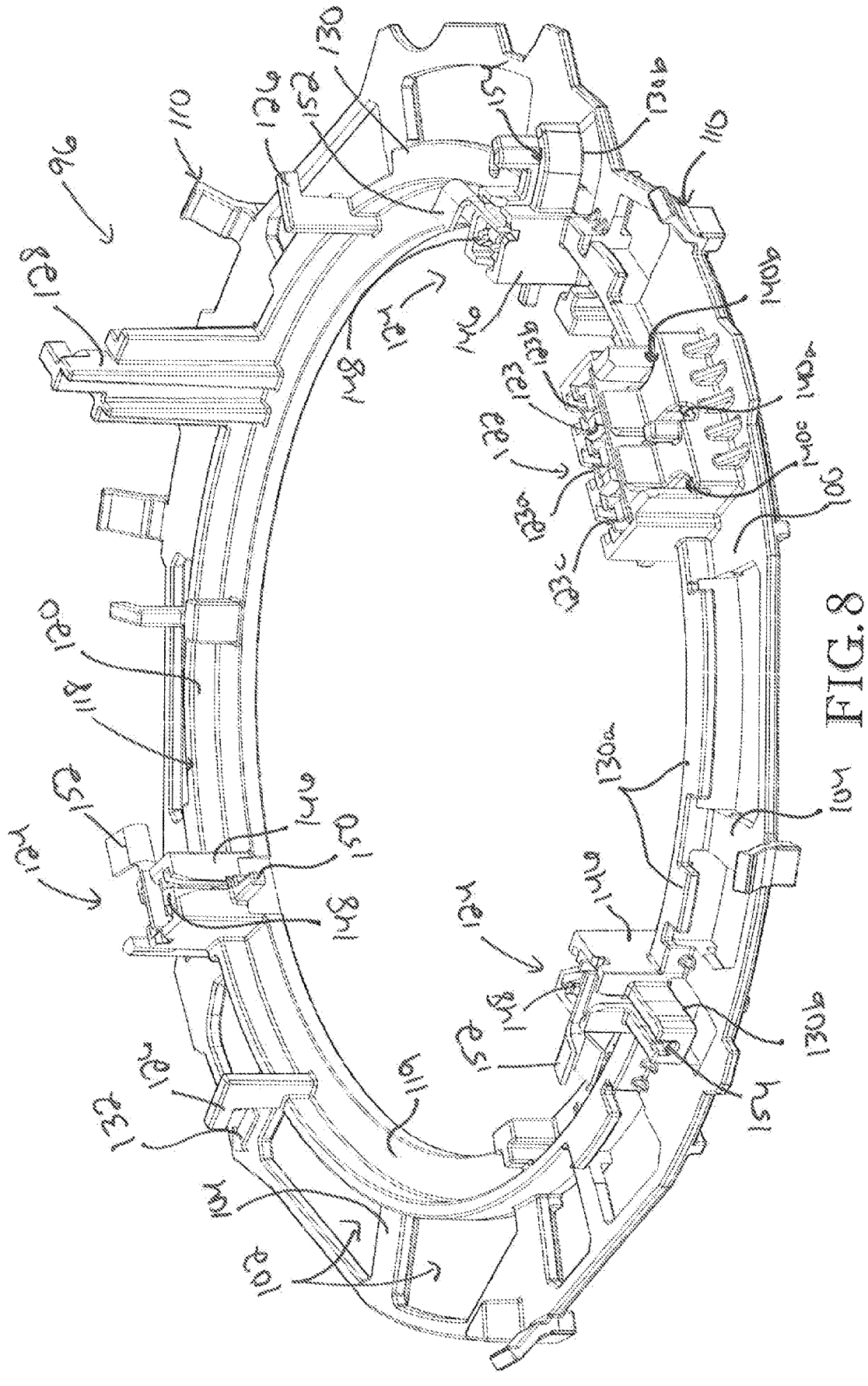
FIG. 8 is a top perspective view of the stator wire insulation ring of the stator assembly of FIGS. 4 and 7, with the terminal assemblies thereof fully assembled but without associated wiring and with the magnet wire tie-offs shown in their original state for clarity.
Figure 9:
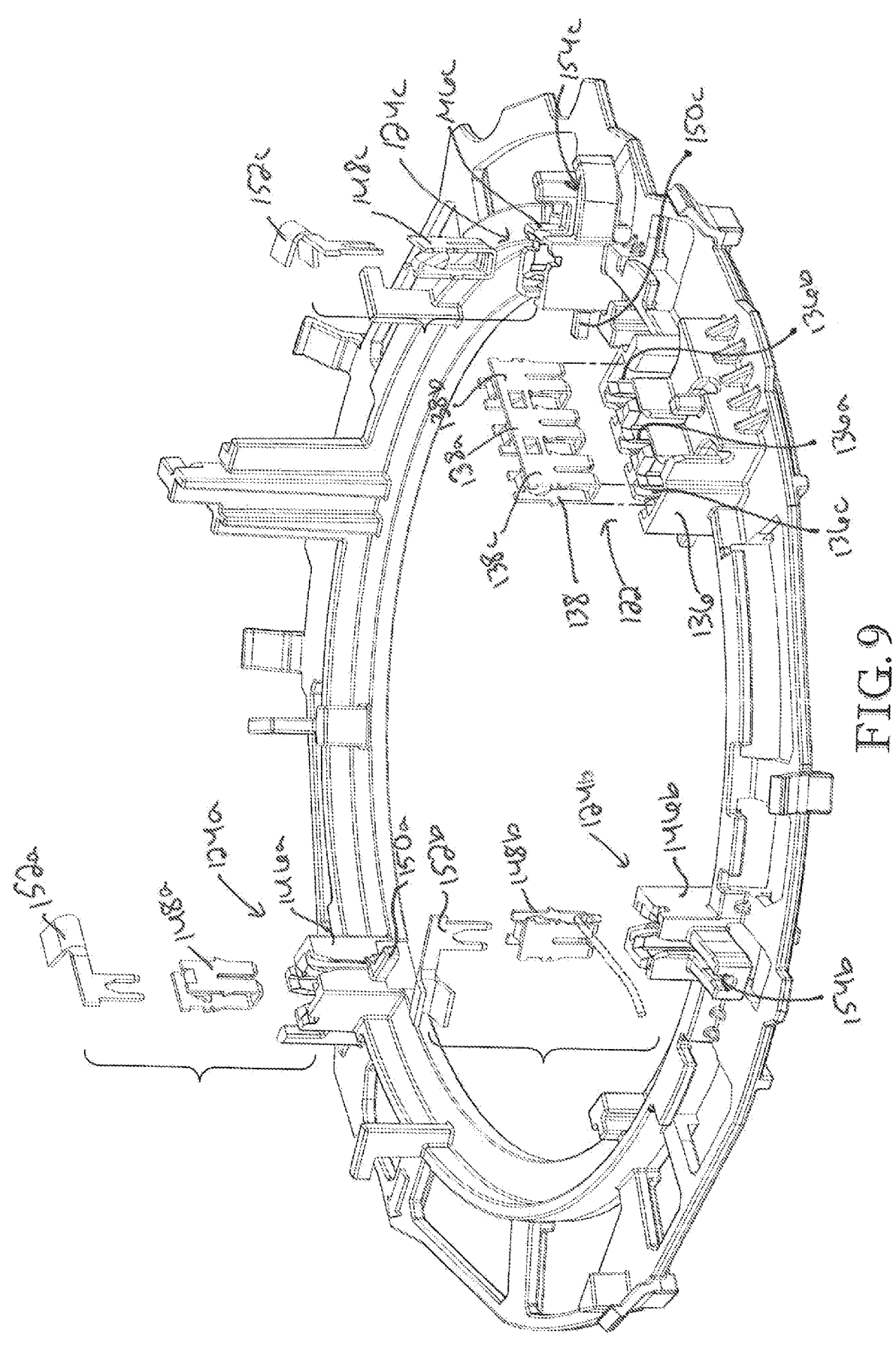
FIG. 9 is an exploded top perspective view of the stator wire insulation ring of FIG. 8, with the terminal assemblies exploded to illustrate discrete components thereof and with a single wire end shown for clarity.
Figure 10:
FIG. 10 is a bottom perspective view of the stator wire insulation ring of FIGS. 8 and 9, with a single one of the magnet wire tie-offs shown in a final cut state.
Figure 11:
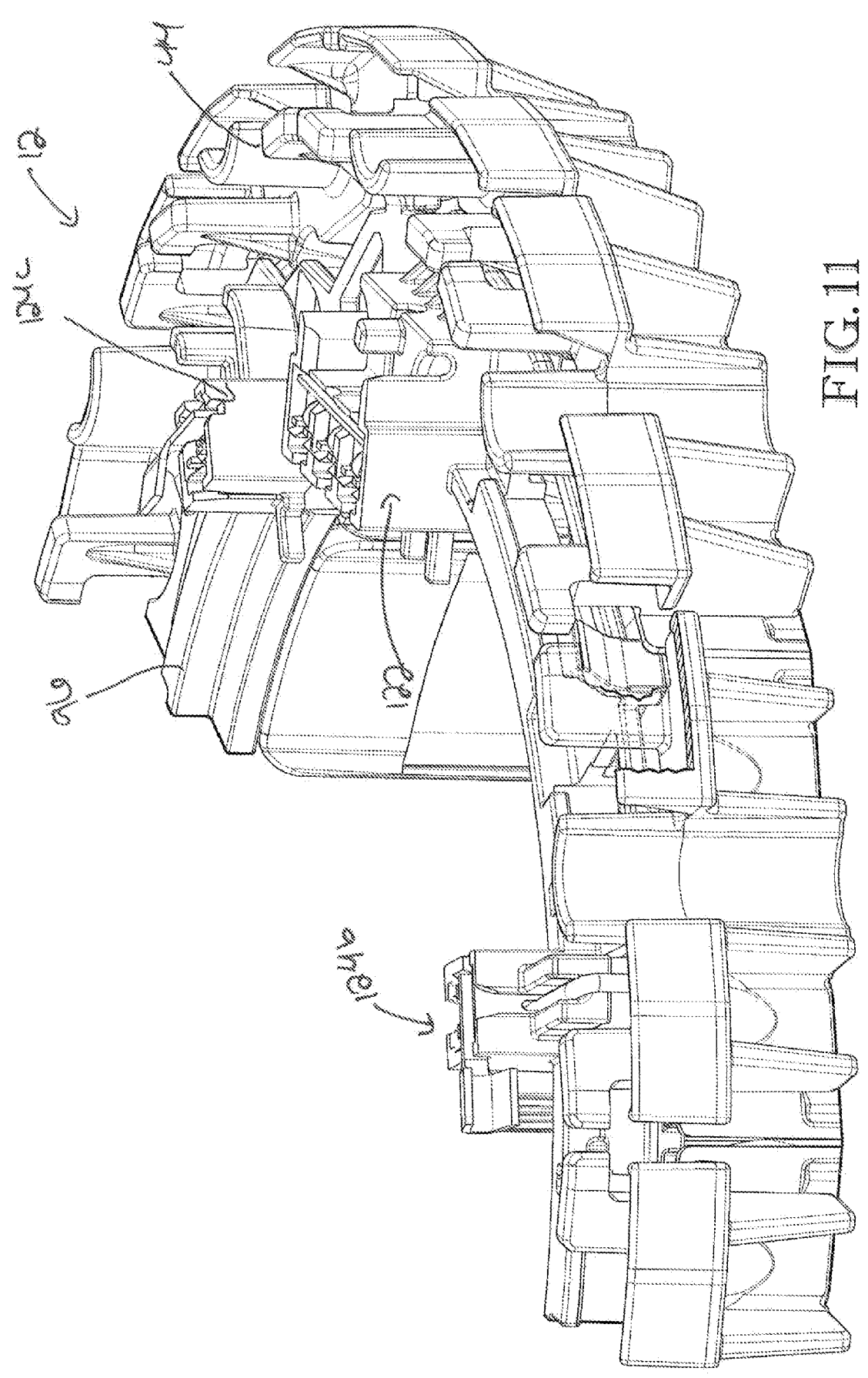
FIG. 11 is a partially sectioned outer side perspective view of a portion of the stator assembly of FIGS. 4 and 7, without wiring shown but with terminals illustrated and with one magnet wire tie-off shown in a final cut state.

More particularly, the ring 96 preferably includes a plurality of arcuately spaced apart, resiliently deflectable fingers 110 configured to engage corresponding ones of the lead end end caps 44 to secure the ring 96 thereto. As best shown in FIG. 7, each finger 110 preferably extends radially and axially from a radially outer edge of the main body 100 to include a base 112 adjacent the body 100, a neck 114 extending obliquely (most preferably at about a forty-five (45) degree angle relative to the axis) from the base 112, and a head 116 disposed at a distal end of the neck 114. The head 116 presents a curved radially outer contact surface 116a. Each finger 110 is preferably resiliently deformable (that is, spring-like) and biased toward a radially outward configuration that extends beyond that which is facilitated by the lead end end caps 44 when the stator assembly 12 is fully assembled. Thus, upon axial insertion of the ring 96 onto the lead end end caps 44, each finger 110 is in part deflected radially inward from its neutral or natural state and consequently exerts a radially outward retentive force against the corresponding end cap 44. In the illustrated embodiment, such force is transmitted through the contact surface 116a and to corresponding ones of the hooks 80 of the corresponding lead end end caps 44.

As will be apparent to those of ordinary skill in the art, the ring 96 is thus disposed generally radially inward of or, alternatively described, is at least substantially circumscribed by the wire management structure 70 of the lead-end end caps 44. In greater detail still, the retaining wall 76 preferably extends around and, in some instances, may even abut a radially outer margin of the main body 100 of the stator ring 96.

In a preferred embodiment, and as discussed in greater detail below, the ring 96 also includes wire management structure 118 including a radially and arcuately extending shelf 119; an inner barrier wall 120 projecting axially from the shelf 119; a WYE connection assembly 122, including terminal assemblies 123; a plurality of arcuately spaced apart magnet wire terminal assemblies 124; a plurality of lead wire guide posts 126; a lead wire securement post 128; and a plurality of wire routing overhangs 130.

It is noted that the terminal assemblies 124, including arcuately spaced apart terminal assemblies 124a, 124b, and 124c, are also referred to herein as first terminal assemblies 124. The terminal assemblies 123, including terminal assemblies 123a, 123b, and 123c disposed adjacent one another, are also referred to herein as second terminal assemblies 123. The first and second terminal assemblies 124 and 123 will be described in greater detail below.

Preferably, the ring 96 further includes a position indicator 132, such as an imprinted arrow or other visually identifiable element. The stator body 24 preferably includes a guide indicator 133 such as a weld line (as formed after making the initially straight core 26 round and securing the ends to each other, for instance). After formation of the coils 28 about the stator core 26, the ring 96 is preferably oriented relative to the stator body 24 such that the position indicator 132 aligns with the guide indicator 133, then snapped into place.

Other orientation techniques are permissible according to some aspects of the present invention, or position indicators might be omitted entirely. However, as will be discussed in greater detail below, proper orientation of the stator ring 96 relative to the stator body 24 is highly beneficial in facilitating the efficient and reliable wiring process enabled by the present invention.

After the ring 96 is secured to the stator body 24 by means of the previously described snap-fit fingers 110, the magnet wire start ends 40a, 40b, and 40c and magnet wire finish ends 42a, 42b, and 42c are routed to corresponding ones of the arcuately spaced apart first wire terminal assemblies 124a, 124b, and 124c and the adjacently disposed second wire terminal assemblies 123a, 123b, and 123c of the WYE connection assembly 122.

In a preferred embodiment and as illustrated, orientation of the ring 96 is such that the routing of the wiring 30 necessary to reach the corresponding ones of the first terminal assemblies 124a, 124b, and 124c and the second terminal assemblies 123a, 123b, and 123c is optimized through the positioning of the WYE connection assembly 122 and first terminal assemblies 124a, 124b, and 124c relative to the wiring start ends 40a, 40b, and 40c and finish ends 42a, 42b, and 42c.

More particularly, as will be described in detail below, each of the magnet wire start ends 40a, 40b, and 40c and magnet wire finish ends 42a, 42b, and 42c projects from the stator body 24 at respective predetermined start end and finish end locations. The stator ring 96 is oriented relative to the stator body 24 such that the first terminal assemblies 124 and the WYE connection assembly 122 (including the second terminal assemblies 123) are disposed in predetermined locations correlating to the predetermined wire start and finish end locations. The various magnet wire start ends 40*a*, 40*b*, and 40*c* and magnet wire finish ends 42*a*, 42*b*, and 42 extend into corresponding ones of the first terminal assemblies 124*a*, 124*b*, and 124*c* and the second terminal assemblies 123*a*, 123*b*, and 123*c*.

Figure 12:
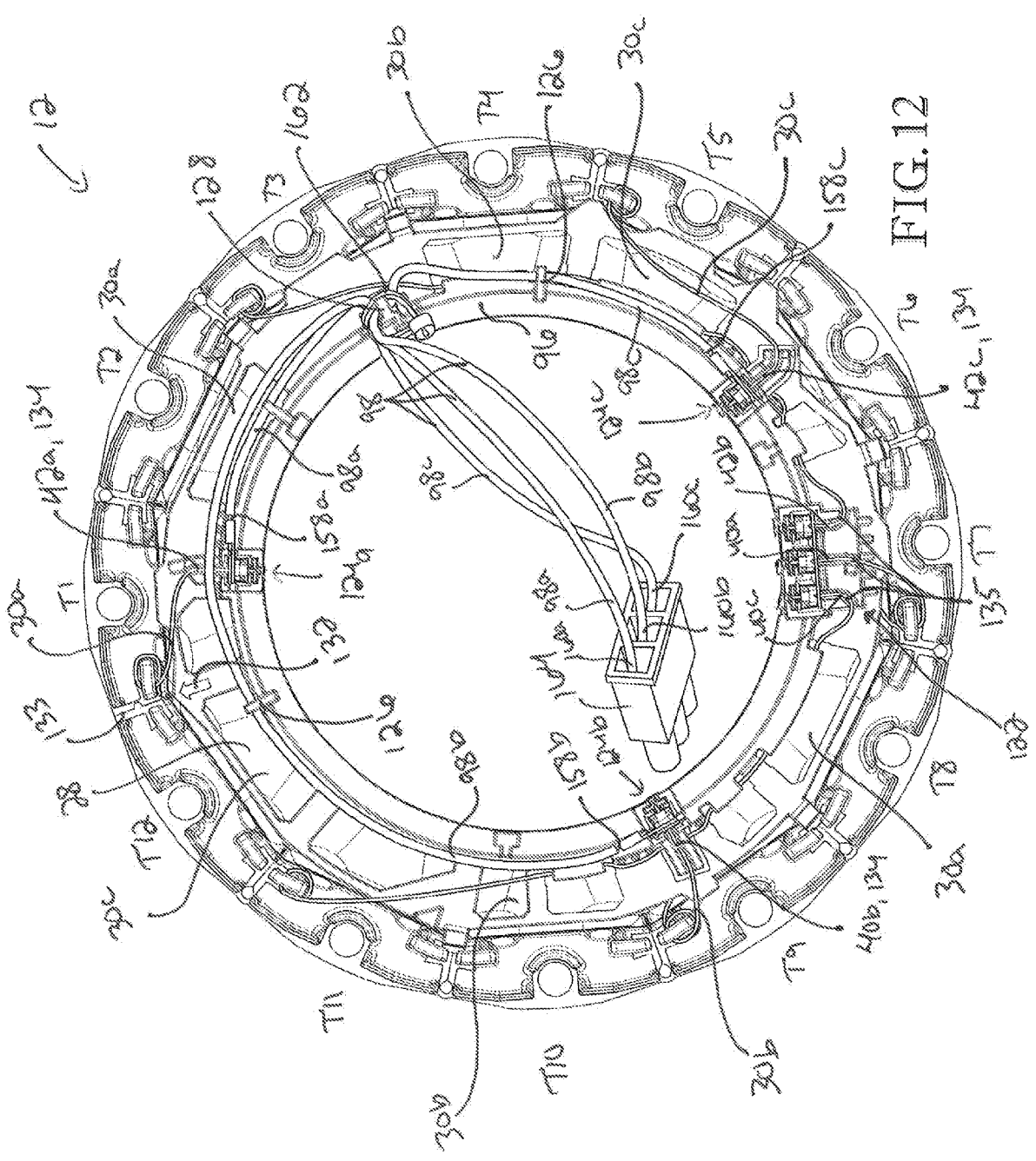
FIG. 12 is a top view of the stator assembly of FIGS. 4, 7, and 11, with terminals inserted, lead wires and selected magnet wires shown schematically, and magnet wire tie-offs cut.
Figure 13:
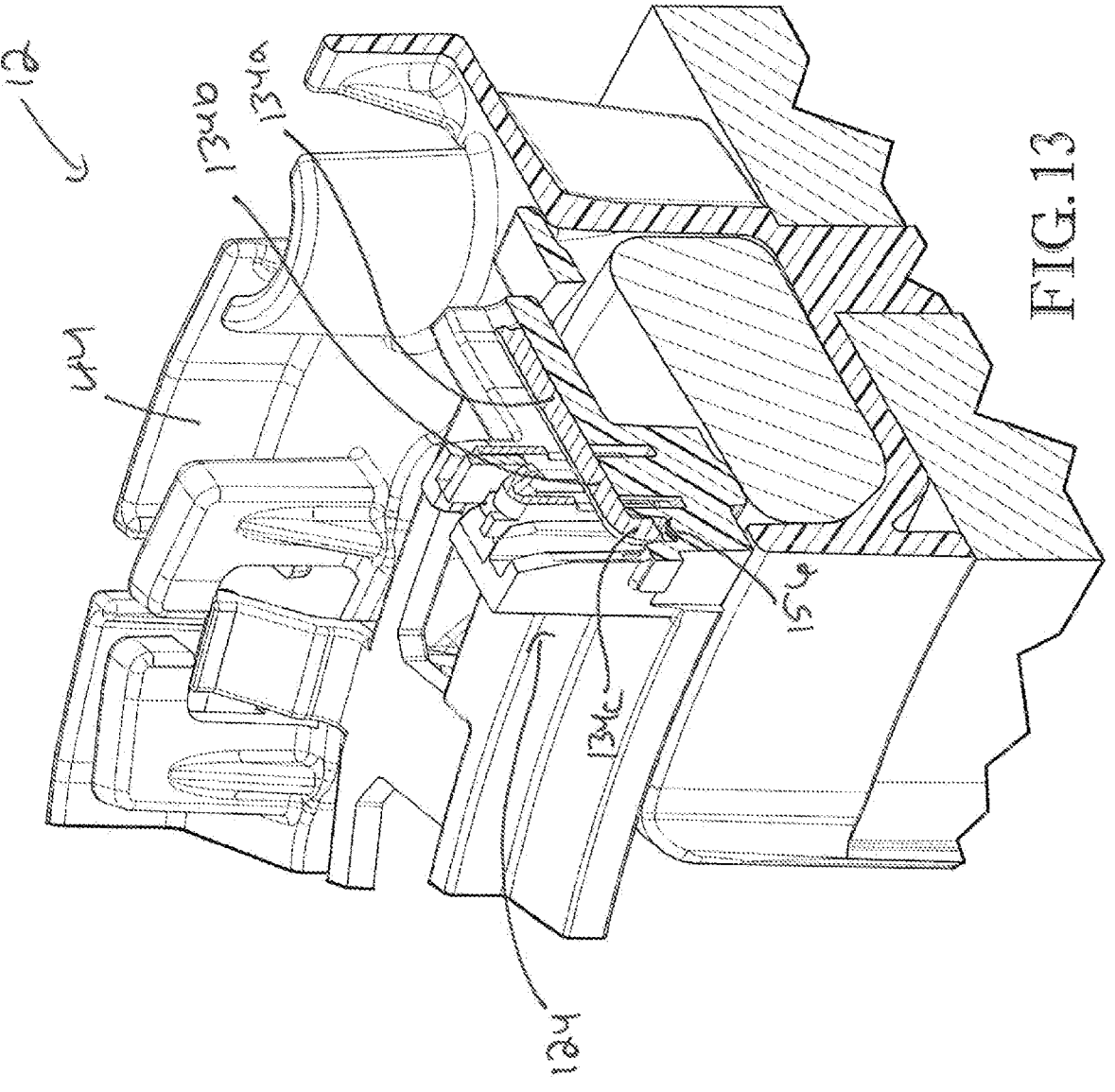
FIG. 13 is an enlarged, partially sectioned inner side perspective view of the stator assembly of FIGS. 4, 7, 11, and 12 illustrating a terminal assembly and associated wire end in a final configuration, with the wire end angled downwardly into a wire-protection recess.
Figure 14:
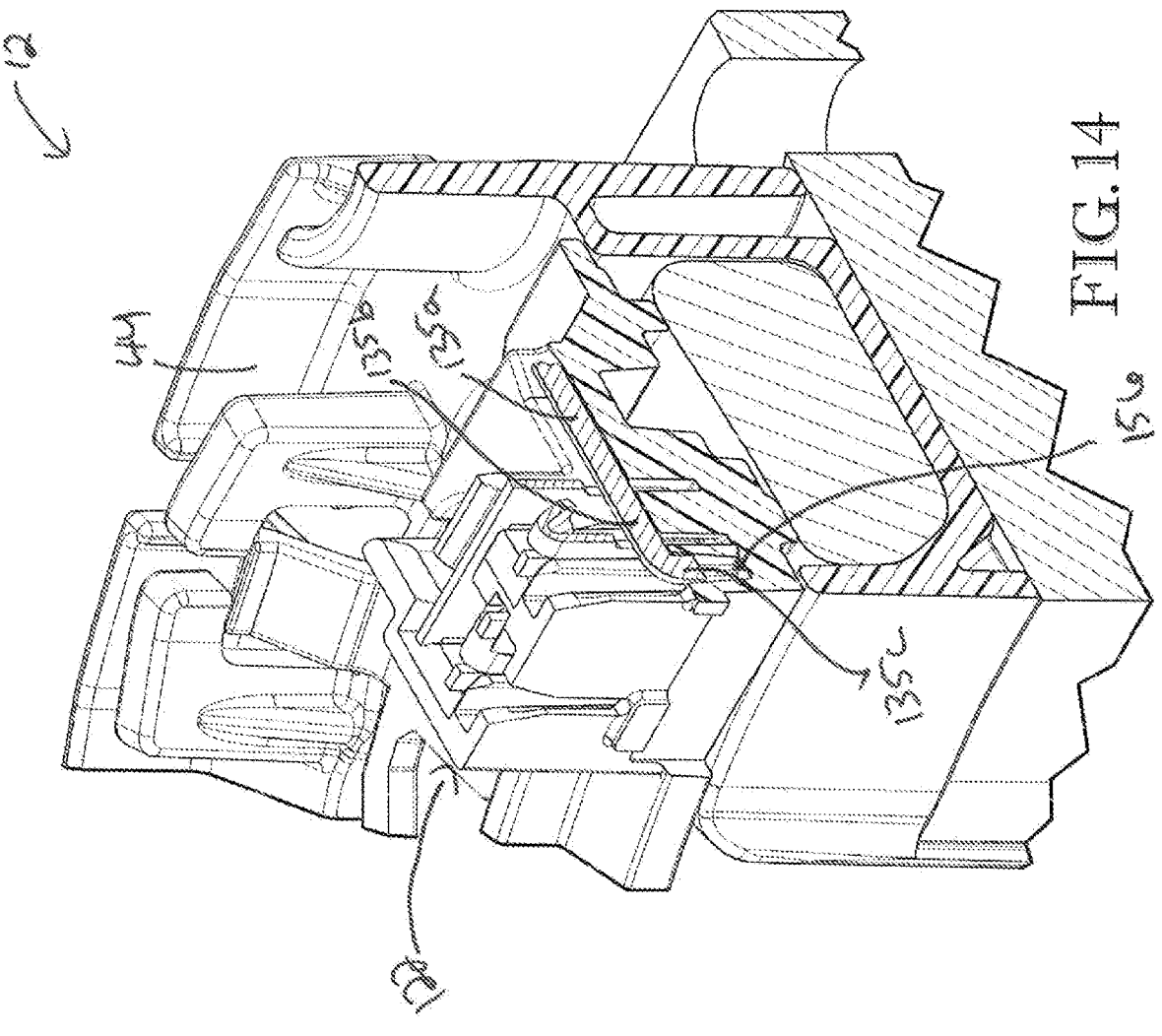
FIG. 14 is an enlarged, partially sectioned inner side perspective view of the stator assembly similar to FIG. 13 but illustrating another terminal assembly and associated wire end in a final configuration, with the wire end angled downwardly into a wire-protection recess.
Figure 15:
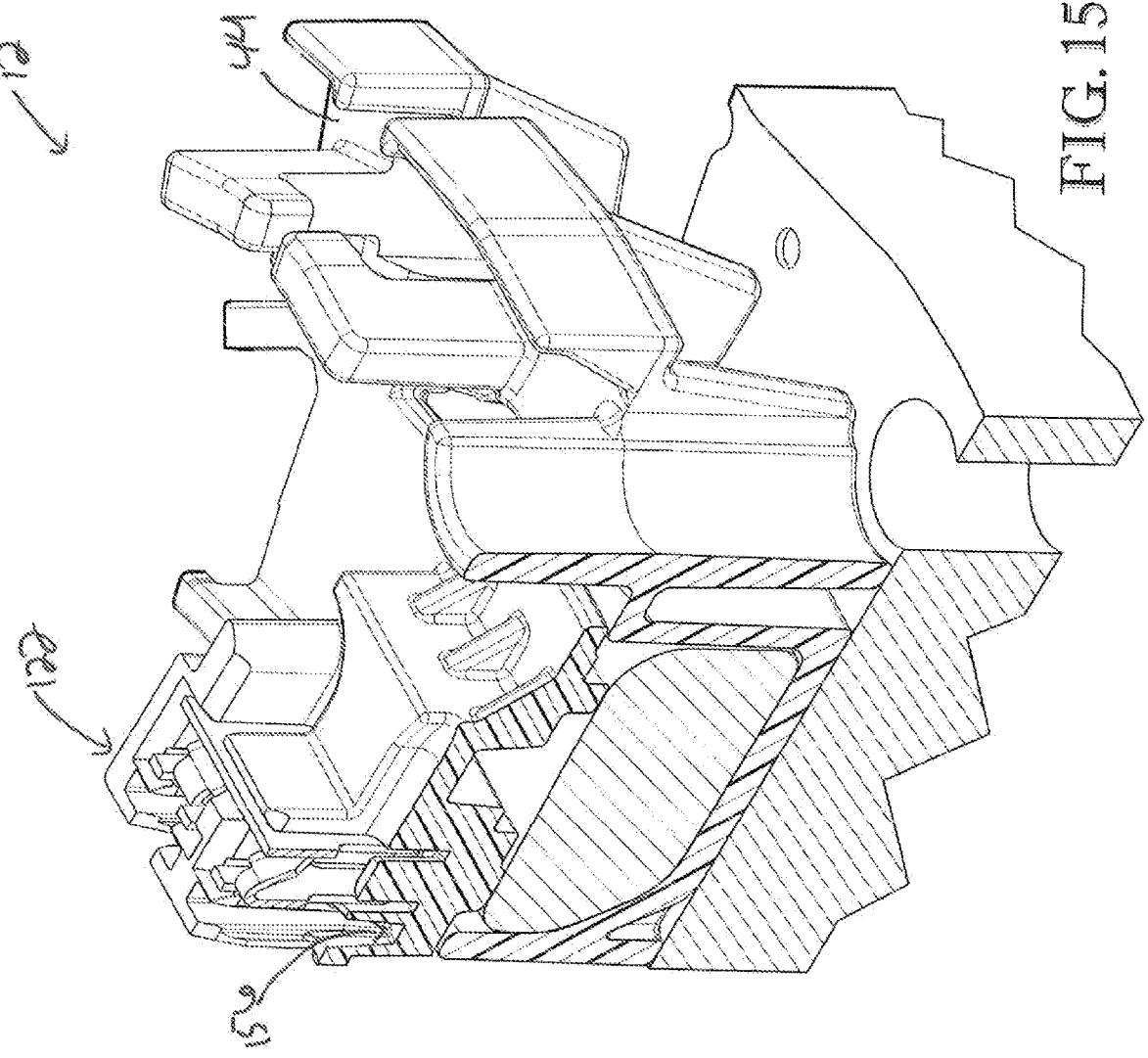
FIG. 15 is an outer side perspective view of the portion of the stator assembly of FIG. 14.

In greater detail still, with reference to FIG. 12, the stator core 26 in the illustrated embodiment includes twelve (12) teeth 32. These teeth 32 are identified in FIG. 12 via indicators T1-T12. In a linear configuration (not shown), prior to shaping of the stator main body 24, the tooth T1 is at the beginning (that is, at a linear end) of the body 24. In the shaped form of the stator main body 24 as shown in FIG. 12 and others, the tooth T1 is disposed immediately clockwise of the weld line or guide indicator 133 and the aligned arrow position indicator 132. The teeth 32 increase in denoted numerals through tooth T12, which is disposed counterclockwise adjacent the weld line 133 and position indicator 132 in the shaped form of the body (or at the end, or the opposite linear end, in the straight form).

In a preferred embodiment, the stator assembly 12 is wound in such a manner that the A-phase magnet wire 30*a* forms A-phase coils 28 about teeth T1, T2, T7, and T8. The magnet wire start end 40*a* of the A-phase magnet wire 30*a* exits tooth T7 at its predetermined start end location and encircles a corresponding one of the lead end end cap hooks 80 before extending to the nearby WYE connection assembly 122, which overlies tooth T7 such that extensive routing of the magnet wire start end 40*a* is unnecessary. The magnet wire finish end 42*a* of the A-phase magnet wire 30*a* exits tooth T1 at its predetermined finish end location and encircles a corresponding one of the lead end end cap hooks 80 before extending to the nearby terminal assembly 124*a*, which overlies tooth T1 such that extensive routing of the magnet wire finish end 42*a* is unnecessary.

The B-phase magnet wire 30*b* forms B-phase coils 28 about teeth T2, T4, T9, and T10. The magnet wire start end 40*b* of the B-phase magnet wire 30*b* exits tooth T9 at its predetermined start end location and encircles a corresponding one of the lead end end cap hooks 80 before extending to the nearby terminal assembly 124*b*, which overlies tooth T9 such that extensive routing of the magnet wire start end 40*b* is unnecessary. The magnet wire finish end 42*b* of the B-phase magnet wire 30*b* exits tooth T3 at its predetermined finish end location and encircles a corresponding one of the lead end end cap hooks 80. The magnet wire finish end 42*b*, however, must thereafter be routed a relatively short distance to the WYE connection assembly 122 which overlies tooth T7.

The C-phase magnet wire 30*c* forms C-phase coils 28 about teeth T5, T6, T11, and T12. The magnet wire start end 40*c* of the C-phase magnet wire 30*c* exits tooth T11 at its predetermined start end location and encircles a corresponding one of the lead end end cap hooks 80. Similarly to the magnet wire finish end 42*b* of the B-phase magnet wire 30*b*, the magnet wire start end 40*c* of the C-phase magnet wire 30*c* must thereafter be routed a relatively short distance to the WYE connection assembly 122 which overlies tooth T7. The magnet wire finish end 42*c* of the C-phase magnet wire 30*c* exits tooth T5 at its predetermined finish end location and encircles a corresponding one of the lead end end cap hooks 80 before extending to the nearby terminal assembly 124*b*, which overlies tooth T6 such that only a very small distance must be traversed by the magnet wire finish end 42*c*. (Such distance is preferably short enough that special routing considerations like those described in more detail below are unnecessary.)

Thus, the magnet wire finish end 42*a* of the A-phase wire, the magnet wire start end 40*b* of the B-phase wire, and the magnet wire finish end 42*c* of the C-phase wire may collectively be understood as first wire ends 134 that are received in corresponding ones of the first terminal assemblies 124. The first wire ends 134 are each connected to corresponding ones of the lead wires 98 at corresponding ones of the first terminal assemblies 124 in a process described in greater detail below.

Similarly, the magnet wire start end 40*a* of the A-phase wire, the magnet wire finish end 42*b* of the B-phase wire, and the magnet wire start end 40*c* of the C-phase wire may collectively be understood as second wire ends 135 that are received in corresponding ones of the second terminal assemblies 123 of the WYE connection assembly 122. The second wire ends 135 are each connected to one another at the WYE connection assembly 122 in a process that is also described in greater detail below.

Figure 16:
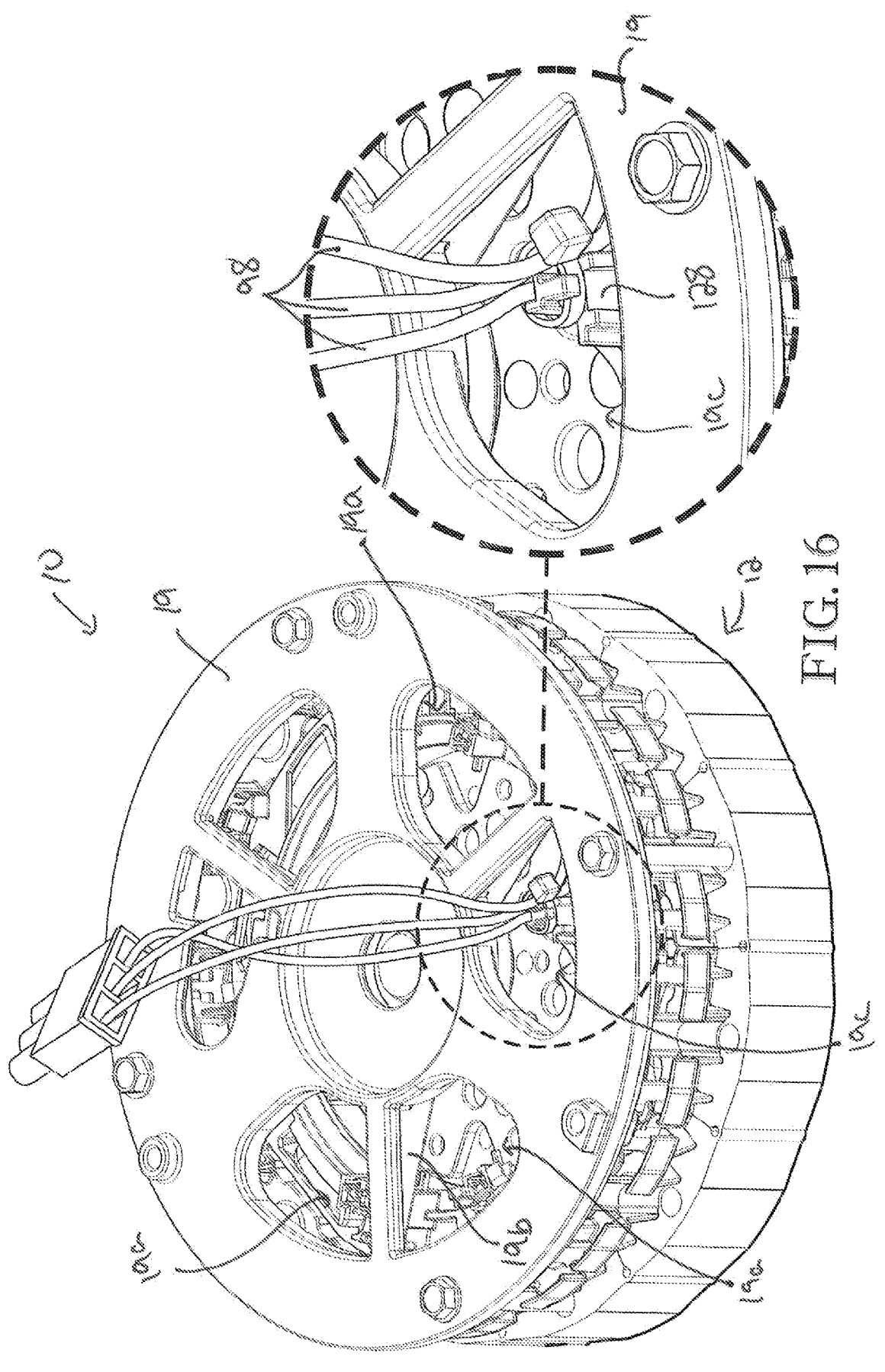
FIG. 16 is a top perspective view of the stator assembly and motor endshield of the motor of FIGS. 1 and 2, particularly illustrating routing of the leads through the endshield.

In the illustrated embodiment, the motor endshield 19 defines a plurality of terminal relief windows 19*a* (see FIG. 16). The terminal relief windows 19*a* connect the motor chamber 16 to the controller chamber 18 and are disposed in locations aligned with the first terminal assemblies 124 and second terminal assemblies 123 to facilitate fitting thereof within the assembled motor 10 without interference with the endshield 19. More particularly, the motor chamber 16 is sized in the illustrated embodiment such that physical interference would potentially occur between ribs 19*b* of motor endshield and the terminal assemblies if terminal relief windows were not provided.

It is noted that such windows are not necessary in all designs, as an increased axial envelope for the motor chamber may resolve any fitment issues. It is also noted that, in designs in which an existing motor endshield must be accommodated, positioning of the terminal assemblies may be at least in part influenced by the presence of any similar reliefs in the existing endshield.

In view of the above, it will be apparent to those of ordinary skill in the art that a simple minimization of wire length may not in all instances lead to optimal positioning of the terminal assemblies, with endshield geometry potentially playing a limiting or guiding role in optimal terminal assembly placement.

Magnet Wire Routing Structure

As noted previously, the stator ring 96 includes a variety of wire routing structures 118, including the radially and arcuately extending shelf 119 and the inner barrier wall 120.

The shelf 119 extends between and electrically isolates the first and second wire ends 134 and 135 from the coils 28 in addition to providing a structural support both for the wire ends 134 and 135 and for others of the wire routing structures 118. For instance, each of the inner barrier wall 120, the lead wire guide posts 126, and the lead wire securement post 128 preferably project axially from the shelf 119. Similarly, the first terminal assemblies 124 and the second terminal assemblies 123 are mounted on the shelf 119.

Proper routing of the magnet wires 30 (and, in particular, the magnet wire finish end 42*b* of the B-phase magnet wire 30*b* and the magnet wire start end 40*c* of the C-phase magnet wire 30*c*) by the ring 96 is at least in part facilitated by the barrier wall 120, which restricts radially inward shifting the wires 30, and the various wire routing overhangs 130. The wire routing overhangs 130 project radially outwardly over the shelf 119 to be axially spaced therefrom. The selected magnet wires 30 extend underneath corresponding ones of the overhangs 130 and are thus disposed between the shelf 119 and the overhangs 130.

In greater detail, the overhangs 130 broadly include barrier wall wire routing overhangs 130*a* and terminal wire routing overhangs 130*b*. The barrier wall wire routing overhangs 130*a* extend circumferentially along and radially outwardly from the barrier wall 120 and function primarily or exclusively as wire routing structures 118. The terminal wire routing overhangs 130*b*, however, are integrally formed with the first terminal assemblies 124*a*, 124*b*, and 124*c*.

WYE Connection Assembly

The WYE connection assembly 122 preferably includes three (3) of the second terminal assemblies 123 (that is, second terminal assemblies 123*a*, 123*b*, and 123*c*). More particularly, the WYE connection assembly 122 preferably includes a housing or receiver 136, which may also be referred to as a pocket cluster 136, defining three (3) second pockets 136*a*. 136*b*, and 136*c*. The WYE connection assembly 122 further preferably includes a second terminal cluster 138 including second terminals 138*a*, 138*b*, and 138*c*, which are preferably integrally formed with one another. The second terminal cluster 138 is selectively insertable into the housing or pocket cluster 136, such that the second terminals 138*a*, 138*b*, and 138*c* are received in the corresponding second pockets 136*a*, 136*b*, and 136*c*.

Although integral formation of the housing 136 is preferred, discrete formation is permissible according to some aspects of the present invention. Similarly, although integral formation of the second terminal assembly 138 to form the plurality of second terminals 138*a*, 138*b*, and 138*c* is preferred, discrete formation is permissible according to some aspects of the present invention.

Despite the preferred integral formation of the housing 136 and the second terminal cluster 138, it is noted that the second terminal assemblies 123*a*, 123*b*, and 123*c* may be understood to respectively include the second pocket 136*a* and the associated second terminal 138*a*, the second pocket 136*b* and the associated second terminal 138*b*, and the second pocket 136*c* and the associated second terminal 138*c*.

The housing 136 and, in turn, the pockets 136*a*, 136*b*, and 136*c* are preferably integrally formed with the main body 100 of the stator ring 96 and project axially from the shelf 119. It is permissible according to some aspects of the present invention, however, for non-integral formation and/or non-axial projection to occur.

In a preferred embodiment, as illustrated, respective ones of the second wire ends 135, including the A-Phase magnet wire start end 40*a*, B-phase magnet wire finish end 42*b*, and C-phase magnet wire start end 40*c*, extend into the pockets 136*a*, 136*b*, and 136*c*.

More particularly, the WYE-connection housing 136 or, alternatively described, the pockets 136*a*. 136*b*, and 136*c*, preferably define three (3) at least substantially radially extending guide channels 140*a*, 140*b*, and 140*c*, respectively. The guide channels 140*a*, 140*b*, and 140*c* receive the second ends 135, including the A-Phase magnet wire start end 40*a*, B-phase magnet wire finish end 42*b*, and C-phase magnet wire start end 40*c*, respectively, and guide them into the corresponding pockets 136*a*, 136*b*, and 136*c*.

Magnet wire tic-offs 142*a*, 142*b*, and 142*c* extend radially inwardly from the housing 136 and enable securement of the portions of the ends 40*a*, 42*b*, and 40*c* having passed through and beyond the pockets 136*a*. 136*b*, and 136*c*. These portions are preferably wrapped around the tie-offs 142, although other securement means, including but not limited to flashing, are permissible as well.

Thus, each of the second ends 135 initially extends through the corresponding channel 140, through the corresponding pocket 136, and to and about the corresponding magnet wire tie-off 142. More particularly, after routing is complete, a guide portion 135*a* of each second end 135 is disposed in the corresponding guide channel 140; a pocket portion 135*b* of each second end 135 is disposed in the corresponding pocket 136; and a tie-off portion (not shown) of each second end 135 is wrapped about the corresponding tie-off 142.

It is noted that the tie-offs 142*a*, 142*b*, and 142*c* preferably initially extend radially inward relative to the main body 100 of the ring 96 but are ultimately cut off or at least substantially removed in some manner (cutting, breaking, and so on) during a wire connection process facilitated by the terminals 138, as will be discussed in greater detail below. That is, both the tie-offs 142 and the portions of the wire ends 40*a*, 42*b*, and 40*c* wrapped thereabout are ultimately removed in a preferred wire connection method.

First Terminal Assemblies

Turning now to the arcuately spaced apart first terminal assemblies 124, it is initially noted that, with certain exceptions to be discussed in detail below, many of the elements of the first terminal assemblies 124 are the same as or very similar to those described in detail above in relation to the second terminal assemblies 123. Therefore, for the sake of brevity and clarity, redundant descriptions will be generally limited here. Unless otherwise specified, the detailed descriptions of the elements presented above with respect to the second terminal assemblies 123 should therefore be understood to apply at least generally to the first terminal assemblies 124, as well.

In a broad sense, similarly to the second terminal assemblies 123, each of the first terminal assemblies 124 preferably includes a pocket 146 and a terminal 148 selectively insertable into the corresponding pocket 146. More particularly, each of the first terminal assemblies 124*a*, 124*b*, and 124*c* preferably includes a respective housing or pocket 146*a*, 146*b*, or 146*c* and a respective magnet wire terminal 148*a*, 148*b*, or 148*c* selectively receivable in the corresponding pocket 146*a*, 146*b*, or 146*c*. Also similarly to the second terminal assemblies 123, a respective tie-off 150*a*. 150*b*, or 150*c* preferably extends radially inwardly from each pocket 145*a*, 146, or 146. Furthermore, each pocket 146*a*, 146*b*, or 146*c* preferably defines a respective at least substantially radially extending guide channel 154*a*, 154*b*, or 154*c*.

Each of the first ends 134, including the magnet wire start or finish ends 42*a*, 40*b*, and 42*c* as noted above, is routed to and through a respective one of the pockets 146*a*, 146*b*, and 146*c*. Upon completion of the routing process, a guide portion 134*a* of each second end 134 is disposed in the corresponding guide channel 154; a pocket portion 134*b* of each second end 134 is disposed in the corresponding pocket 146; and a tie-off portion (not shown) of each second end 134 is wrapped about the corresponding tie-off 150.

In contrast to the second terminal assemblies 123*a*, 123*b*, and 123*c*, the first terminal assemblies 124*a*, 124*b*, and 124*c* preferably further include respective lead wire terminals 152*a*, 152*b*, and 152*c*. The function of the lead wire terminals 152*a*, 152*b*, and 152*c* will be discussed in greater detail below. However, it is briefly noted that, whereas the second terminal assemblies 123 function to join the second wire ends 135 to one another, the first terminal assemblies 124 function to join the first wire ends 134, including the magnet wire start or finish ends 42*a*, 40*b*, and 42*c*, to respective ones of the lead wires 198. The lead wire terminals 152 aid in this function.

Terminal Insertion

After the magnet wire start and finish ends 42*a*, 40*b*, and 42*c* (that is, the first ends 134) are in place in the various terminal pockets 146*a*, 146*b*, and 146*c* and the magnet wire start and finish ends 40*a*, 42*b*, and 40*c* (that is, the second ends 135) are in place in the various WYE connection pockets 136*a*, 136*b*, and 136*c* as noted above, magnet wire terminals 148*a*, 148*b*, and 148*c* are inserted into the respective terminal pockets 146*a*, 146*b*, and 146*c*, and the WYE connection terminal cluster 138 is inserted into the WYE connection pocket cluster 136.

The various terminals 138*a*, 138*b*, 138*c*, 148*a*, 148*b*, and 148*c* are preferably insulation displacement connector (IDC) terminals configured to strip insulation from the portions of the corresponding magnet wire starts and finishes 40 and 42 disposed in the corresponding ones of the pockets 136 and 146. In a preferred embodiment, conventional terminals such as MAG-MATE terminals are used, although alternate designs are permissible.

The terminals 138 and 148 are preferably inserted in an automated process using terminal insertion equipment (not shown) that also trims away (that is, cuts off) the associated tie-offs 142 and 150 and the portions of the magnet wires 30 associated therewith (see, for instance, FIG. 12). Such trimming facilitates interference-free rotation of the rotor 14.

In a preferred methodology, loading and orientation of the stator assembly 12 into the terminal insertion equipment is done manually by an operator, although further automated methodologies fall within the scope of the present invention. Furthermore, in an alternate method, the terminals might instead be inserted manually.

After insertion of the terminals 138 and 148, the magnet wire pocket portions 135*b* disposed within the WYE connection pockets 136 are electrically connected to one another. As discussed in greater detail below, however, the magnet wire pocket portions 134*b* disposed within the first terminal assemblies 124 are simply ready for electrical connection with corresponding ones of the lead wires 98.

Wire-Protection Recesses

In a preferred embodiment, the stator ring 96 defines a plurality of wire-protection recesses 156, each of which is disposed adjacent a corresponding one of the first terminal pockets 146 or second terminal pockets 136. More particularly, each wire-protection recess 156 is disposed adjacent a radially inner margin of the corresponding one of the terminal pockets 146 or 136.

After cutting off of the tie-offs 142 and 150 and the magnet wire tie-off portions during insertion of the various terminals 138 and 148, a terminal portion 134*c* or 135*c* of each of the first wire ends 134 and second wire ends 135, respectively, remains projecting radially inwardly past the corresponding terminal 138 or 148 and associated terminal pocket 136 or 146 (that is, toward and potentially beyond the radially inner margins thereof). The terminal portions 134*c* and 135*c* may be subject to corrosive or otherwise potentially damaging environments during use of the motor 10. Such potentially damaging environments include but are not limited to those featuring high humidity and/or salinity. It is therefore preferable to protect the terminal portions 134*c* and 135*c* in some manner.

More particularly, each terminal portion 134*c* and 135*c* is preferably "poked down" into or "buried" in the corresponding one of the wire-protection recesses 156, such that the first and second wire ends 134 and 135 in a final configuration extend beyond the interiors of the respective ones of the terminal pockets 136 and 146 into the corresponding ones of the wire-protection recesses 156 before terminating therein. The terminal portions 134*c* and 135*c* may thus also be referred to as buried portions 134*c* and 135*c*.

Preferably, each of first and second wire ends 134 and 135 forms an angle between about sixty (60) degrees and about one hundred twenty (120) degrees between the corresponding terminal pocket 136 or 146 and the corresponding wire-protection recess 156. More preferably, each of the first and second wire ends 134 and 135 forms an angle between about eighty (80) degrees and about one hundred (100) degrees between the corresponding terminal pocket 136 or 146 and the corresponding wire-protection recess 156. Most preferably, each of the first and second wire ends 134 and 135 forms an angle of about ninety (90) degrees between the corresponding terminal pocket 136 or 146 and the corresponding wire-protection recess 156.

As will be readily apparent to those of ordinary skill in the art, similar angles are preferably formed by the wire-protection recesses 156 relative to the shelf 119, with the wire-protection recesses 156 and the terminal or buried portions 134*c* and 135*c* of the wires 30 most preferably extending axially.

In a preferred embodiment, each of the wire-protection recesses 156 is at least partly filled with a corrosion resistant material (not shown) such as grease. Most preferably, prior to insertion of the terminal portions 134*c* and 135*c*, the recesses 156 are completely filled with such material or filled sufficiently such that each of the terminal portions 134*c* and 135*c* is at least substantially coated by the material within the corresponding wire-protection recess 156 when poked thereinto. Omission of a coating falls within the scope of some aspects of the present invention, however.

It is particularly noted that the above-described wire end protection technique is broadly applicable to a variety of applications in which corrosion of wire ends is problematic. Such technique may be particularly of benefit in motor-related applications in which conventional varnishing of a stator assembly has been found insufficiently protective.

Lead Wire Routing Structure and Connection

In a preferred embodiment, as noted above, a plurality of lead wires 98 are provided. The lead wires 98 preferably include an A-phase lead wire 98*a*, a B-phase lead wire 98*b*, and a C-phase lead wire 98*c*. The lead wires 98*a*, 98*b*, and 98*c* include respective start ends 158*a*, 158*b*, and 158*c* and respective finish ends 160*a*, 160*b*, and 160*c*.

After placement of the various WYE and magnet wire terminals 138 and 148 as noted above, the lead wire start ends 158*a*, 158*b*, and 158*c* are received by corresponding ones of the lead wire terminals 152*a*, 152*b*, and 152*c* and subsequently electrically connected to the corresponding first ends 134 (that is, the magnet wire start or finish ends 42*a*, 40*b*, and 42*c*). More particularly, such electrical connection is facilitated via engagement of the lead wire terminals 152*a*, 152*b*, and 152*c* with corresponding ones of the magnet wire terminals 148*a*, 148*b*, and 148*c* and, in turn, with the electrically exposed sections of the pocket portions 134*b* of the first ends 134 (as "cut" by the respective terminals 148).

Alternatively stated, each of said lead wires 98 is electrically interconnected via a corresponding one of the lead wire terminals 152 and magnet wire terminals 138 to a corresponding one of the first wire ends 134 disposed in respective ones of the first terminal pockets 146.

In the illustrated embodiment, the lead wire terminals 152a, 152b, and 152c are poke-in flag terminals, although other types of terminals fall within the scope of the present invention, provided such terminals are complementary with other associated terminals and features.

The lead wires 98 are then routed to the aforementioned lead wire securement post or tie wrap post 128, aided by the plurality of lead wire guide posts 126 when applicable. More particularly, in the illustrated embodiment, two (2) of the lead wires 98 extend radially outward of and alongside corresponding ones of the guide posts 126.

The lead wires 98 are each preferably secured to the lead wire securement post 128 by a tie 162, although other securement means (such as hooks, slots, tapes, and so on) fall within the scope of some aspects of the present invention.

Finally, the lead wires 98 extend into and are secured within a plug or housing 164 configured for connection to the controller or another customer-defined location. That is, the lead wire finish ends 160a. 160b, and 160c are received within the plug 164.

In a preferred embodiment, the endshield 19 defines a lead wire aperture 19c interconnecting the motor chamber 16 to the controller chamber 18. The lead wire securement post 128 is preferably positioned such that, upon assembly of the motor 10 in a broad sense, the lead wire securement post 128 is axially aligned with at least a portion of the lead wire aperture 19c. The lead wire securement post 128 thus preferably extends from the motor chamber 16 toward the lead wire aperture 19c. The wires 98 will thus pass readily through the lead wire aperture 19c and into the controller chamber 18 in a well-defined and well-protected manner, eliminating the need for a rubber-grommeted opening or other features directed toward non-damaging lead wire management.

Although such greater extension is not illustrated, it is also permissible according to some aspects of the present invention for the lead wire securement post 128 to extend into the aperture or even through the aperture and into the controller chamber.

It is noted that the position of the lead wire aperture 19c is preferably chosen to facilitate ease of downstream connection of the lead wire harness and minimize exposure of the leads to excessive heat. However, alternative and/or additional considerations may also be made when determining preferred placement.

Furthermore, multiple suitable apertures may be provided, thus making acceptable orientation of the endshield more readily achieved. For instance, terminal relief windows and lead wire apertures may be in some embodiments similarly or identically configured.

CONCLUSION

As apparent from the above, the stator wire insulation ring 96 provides numerous benefits and advantages, simplifying assembly of the motor 10 yet maintaining or improving appropriate functional characteristics thereof. Certain of these advantages are reiterated below, although such listing is not exhaustive.

Among other things, for instance, the inventive ring 96 and associated assembly processes reduce labor and assembly time by as much as about seventy five percent (75%) relative to that associated with conventional prior art stators. Reduction in wire routing distance via carefully selected placement of the terminal assemblies 123 and 124, as well as provision of defined or fixed magnet wire-to-magnet wire and magnet wire-to-lead wire connection locations, also reduces the likelihood of wiring errors.

Snap-fit assembly of the ring 96 onto the stator main body 24 is both effective and efficient.

The strut-like design of the stator ring 96 facilitates cooling of the stator assembly 12 via airflow through the openings 102.

Magnet wire and lead electrical connection quality is improved due to the use of IDC terminals 138 and 148 and poke-in flag terminals 152 that facilitate reliable and effective connections.

The ring 96 is preferably formed of an at least substantially electrically insulative material, such as a synthetic resin, so as to insulate the magnet wires 30 and ensure electrical clearance to conductive material. Provision of the wire routing overhangs 130 also specifically aids in insulation, eliminating the need for insulation tubing of the magnet wires 30.

Still further, the ring 96 orients the lead wire securement post 128 in such a manner relative to the lead wire aperture 19c in the endshield 19 as to eliminate the need for a rubber-grommeted opening into the controller chamber 18 while also positioning the leads 98 for efficient downstream routing and limited exposure to high temperature components.

Zip ties or other discrete securement elements are not necessary for routing of the lead wires 98 due to the provision of the guide posts 126.

Finally, corrosive damage or other environmentally driven degradation of the terminal or buried portions 134c and 135c of the magnet wires 30 is reduced or eliminated by the presence of the poke-in wire-protection recesses 156 and the coating of the terminal portions 134c and 135c therein with a corrosion-resistant material.

Features of one or more embodiments described above may be used in various combinations with each other and/or may be used independently of one another. For instance, although a single disclosed embodiment may include a preferred combination of features, it is within the scope of certain aspects of the present invention for the embodiment to include only one (1) or less than all of the disclosed features, unless the specification expressly states otherwise or as might be understood by one of ordinary skill in the art. Therefore, embodiments of the present invention are not necessarily limited to the combination(s) of features described above.

The preferred forms of the invention described above are to be used as illustration only and should not be utilized in a limiting sense in interpreting the scope of the present invention. Obvious modifications to the exemplary embodiments, as hereinabove set forth, could be readily made by those skilled in the art without departing from the spirit of the present invention.

Although the above description presents features of preferred embodiments of the present invention, other preferred embodiments may also be created in keeping with the principles of the invention. Furthermore, as noted previously, these other preferred embodiments may in some instances be realized through a combination of features compatible for use together despite having been presented independently as part of separate embodiments in the above description.

What is claimed is:

1. An electric motor comprising:
   a stator assembly including—
   a stator body including a core and a plurality of electrically conductive wires wound about the core, each of said electrically conductive wires including a first wire end projecting from the stator body at a predetermined first wire end location, and a generally toroidal stator ring defining a plurality of arcuately spaced apart first terminal pockets, each configured to receive a wire-connecting terminal, said stator ring being oriented relative to the stator body such that the first terminal pockets are disposed in predetermined first terminal pocket positions correlating to the predetermined first wire end locations, each of said first wire ends extending into a respective one of said first terminal pockets, each of said terminal pockets defining a guide channel, each of said first wire ends including a guide portion received in a corresponding one of the guide channels, said guide channels directing the first wire ends within the corresponding first terminal pockets, a plurality of wire-connecting terminals, each of said terminals being received in a corresponding one of said first terminal pockets, said guide channels directing the first wire ends to respective ones of the terminals.

2. The electric motor of claim 1, further comprising:

a plurality of lead wires, each of said lead wires being electrically interconnected to a corresponding one of the first wire ends disposed in a respective one of the first terminal pockets.

3. The electric motor of claim 2, said stator ring defining a lead wire securement post, each of said lead wires being secured to the lead wire securement post.

4. The electric motor of claim 3, further comprising:

a housing defining a motor chamber and a controller chamber, said stator assembly being at least substantially received within said motor chamber, said housing including an endshield disposed between said motor chamber and said controller chamber, said endshield defining a lead wire aperture connecting said motor chamber to said controller chamber, said lead wire securement post extending from said motor chamber toward said lead wire aperture, said lead wires extending from said lead wire securement post and through said aperture into the controller chamber.

5. The electric motor of claim 2, said stator ring including a plurality of lead wire guide posts, at least one of said lead wires extending radially outward of and alongside at least one of said guide posts.

6. The electric motor of claim 1, each of said electrically conductive wires further including a second wire end projecting from the stator body at a predetermined second wire end location, said stator ring defining a plurality of second terminal pockets adjacent one another, said stator ring being oriented relative to the stator body such that the second terminal pockets are disposed in predetermined second terminal pocket positions correlating to the predetermined second wire end locations, each of said second wire ends being received within a respective one of said second terminal pockets.

7. The electric motor of claim 1, said stator ring defining a plurality of wire-protection recesses, each of said wire-protection recesses being disposed adjacent a corresponding one of the first terminal pockets, each of said first wire ends further extending from the respective one of the first terminal pockets into the corresponding one of the wire-protection recesses and terminating therein.

8. The electric motor of claim 7, each of said first wire ends forming an angle between about 60 degrees and about 120 degrees between the corresponding first terminal pocket and the corresponding wire-protection recess.

9. The electric motor of claim 7, said wire-protection recesses being disposed adjacent a radially inner margin of said first terminal pockets.

10. The electric motor of claim 7, said wire-protection recesses being at least partly filled with a corrosion-resistant material, said first wire ends being at least substantially coated by said material within the wire-protection recesses.

11. The electric motor of claim 1, said stator ring including a plurality of axially extending, resiliently deflectable fingers for securing the stator ring relative to the stator body.

12. The electric motor of claim 11, said stator assembly further including a plurality of endcaps secured to the stator core, said electrically conductive wiring being wound about the endcaps, said fingers engaging corresponding ones of the endcaps.

13. The electric motor of claim 1, said electrically conductive wires including an A-phase wire, a B-phase wire, and a C-phase wire, said first wire ends including a finish end of the A-phase wire, a start end of the B-phase wire, and a finish end of the C-phase wire.

14. The electric motor of claim 1, said electrically conductive wires forming a plurality of coils about the core, said stator ring including a main body comprising a radially and arcuately extending shelf, said shelf extending between said first wire ends and said coils, such that the shelf is disposed axially between the first wire ends and the coils.

15. The electric motor of claim 14, said stator ring defining a plurality of wire routing overhangs projecting over the shelf, said electrically conductive wires extending under said wire routing overhangs to be disposed between said shelf and said wire routing overhangs.

16. The electric motor of claim 14, said first terminal pockets extending axially from said shelf.

17. The electric motor of claim 1, said stator ring including a position indicator, said stator body including a guide indicator, said stator ring being oriented relative to the stator body such that the position indicator aligns with the guide indicator.

18. The electric motor of claim 1, further comprising:

a housing defining a motor chamber and a controller chamber, said stator assembly being at least substantially received within said motor chamber, said housing including an endshield disposed between said motor chamber and said controller chamber, said endshield defining a plurality of terminal relief windows each connecting said motor chamber to said controller chamber, each of said first terminal pockets being aligned with one of said terminal windows.

* * * * *